(12) United States Patent
Lee et al.

(10) Patent No.: US 11,079,632 B2
(45) Date of Patent: Aug. 3, 2021

(54) DISPLAY DEVICE COMPRISING A FIRST ALIGNMENT LAYER HAVING REACTIVE MESOGENS AND A PHOTOINITIATOR AND A SECOND ALIGNMENT LAYER NOT HAVING THE PHOTOINITIATOR

(71) Applicant: Samsung Display Co., Ltd., Yongin-Si (KR)

(72) Inventors: Hyoungcheol Lee, Suwon-si (KR); Jang-Il Kim, Asan-si (KR); Osung Seo, Seoul (KR); YeoGeon Yoon, Suwon-si (KR); SooJeong Huh, Yongin-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 439 days.

(21) Appl. No.: 15/645,214

(22) Filed: Jul. 10, 2017

(65) Prior Publication Data

US 2017/0307941 A1    Oct. 26, 2017

Related U.S. Application Data

(63) Continuation of application No. 14/632,395, filed on Feb. 26, 2015, now Pat. No. 9,720,283.

(30) Foreign Application Priority Data

Feb. 26, 2014  (KR) .................. 10-2014-0022681
Feb. 17, 2015  (KR) .................. 10-2015-0023968

(51) Int. Cl.
*G02F 1/1337* (2006.01)
*G02F 1/1333* (2006.01)

(52) U.S. Cl.
CPC .. *G02F 1/133726* (2021.01); *G02F 1/133711* (2013.01); *G02F 1/133753* (2013.01); *G02F 1/133305* (2013.01); *G02F 1/133788* (2013.01)

(58) Field of Classification Search
CPC ........ G02F 2001/133726; G02F 2001/133746; G02F 2001/133749; G02F 2001/133761; G02F 2001/133765; G02F 2001/133773
See application file for complete search history.

(56) References Cited

U.S. PATENT DOCUMENTS

| 5,139,696 A | 8/1992 | Frechet et al. |
| 5,781,262 A | 7/1998 | Suzuki et al. |

(Continued)

FOREIGN PATENT DOCUMENTS

| JP | 2002343440 A | 11/2002 |
| JP | 2006514073 A | 4/2006 |

(Continued)

*Primary Examiner* — Paul C Lee
(74) *Attorney, Agent, or Firm* — Cantor Colburn LLP

(57) ABSTRACT

A curved display device includes a first substrate, a second substrate facing the first substrate, a liquid crystal layer disposed between the first and second substrates, the liquid crystal layer including liquid crystal molecules, a first alignment layer including reactive mesogens which are polymerized with each other, the first alignment layer being disposed between the first substrate and the liquid crystal layer, and a second alignment layer disposed between the liquid crystal layer and the second substrate, where the reactive mesogens have a functional group having charges.

14 Claims, 18 Drawing Sheets

(56) References Cited

U.S. PATENT DOCUMENTS

| | | |
|---|---|---|
| 6,452,573 B1 | 9/2002 | Martinot-Lagarde et al. |
| 7,449,223 B2 | 11/2008 | Kawamura et al. |
| 7,767,108 B2 | 8/2010 | Kataoka |
| 8,153,208 B2 | 4/2012 | Lee et al. |
| 8,477,271 B2 | 7/2013 | Enomoto |
| 9,448,439 B2 | 9/2016 | Sohn et al. |
| 2005/0140837 A1 | 6/2005 | Crawford et al. |
| 2006/0188662 A1 | 8/2006 | Farrand et al. |
| 2007/0201616 A1* | 8/2007 | Rowlands ............... G01T 1/246 378/98.2 |
| 2007/0296893 A1* | 12/2007 | Sha ................. G02F 1/133753 349/106 |
| 2008/0143933 A1* | 6/2008 | Sha ................. G02F 1/133753 349/106 |
| 2009/0079923 A1* | 3/2009 | Miyachi ........... G02F 1/133788 349/129 |
| 2009/0161048 A1* | 6/2009 | Satake ............. G02F 1/133305 349/110 |
| 2010/0060844 A1* | 3/2010 | Sawatari .......... G02F 1/133788 349/187 |
| 2010/0091229 A1 | 4/2010 | Liu et al. |
| 2010/0182556 A1* | 7/2010 | Oh ................... G02F 1/133707 349/127 |
| 2010/0209694 A1* | 8/2010 | Aoyama ............. G02B 5/0242 428/317.9 |
| 2010/0283951 A1 | 11/2010 | Lee et al. |
| 2011/0255039 A1* | 10/2011 | Enomoto .......... G02F 1/133305 349/113 |
| 2011/0261295 A1* | 10/2011 | Kim ................. G02F 1/133707 349/96 |
| 2012/0249934 A1 | 10/2012 | Li et al. |
| 2012/0297651 A1 | 11/2012 | Harris |
| 2012/0314168 A1 | 12/2012 | Kang et al. |
| 2013/0208222 A1 | 8/2013 | Song et al. |
| 2014/0320790 A1* | 10/2014 | Lee .................. G02F 1/133788 349/123 |

FOREIGN PATENT DOCUMENTS

| | | |
|---|---|---|
| JP | 2007333818 A | 12/2007 |
| JP | 2009092816 A | 4/2009 |
| JP | 5095828 B2 | 12/2012 |
| JP | 2013210566 A | 10/2013 |
| KR | 100635086 B1 | 10/2006 |
| KR | 1020110011380 A | 2/2011 |
| KR | 101106528 B1 | 1/2012 |
| KR | 1020120135731 A | 12/2012 |
| KR | 1020130062511 A | 6/2013 |
| KR | 1020130092816 A | 8/2013 |

* cited by examiner

DISPLAY DEVICE COMPRISING A FIRST ALIGNMENT LAYER HAVING REACTIVE MESOGENS AND A PHOTOINITIATOR AND A SECOND ALIGNMENT LAYER NOT HAVING THE PHOTOINITIATOR

This application is a continuation of U.S. patent application Ser. No. 14/632,395, filed on Feb. 26, 2015, which claims priority to Korean Patent Application No. 10-2014-0022681, filed on Feb. 26, 2014, and Korean Patent Application No. 10-2015-0023968, filed on Feb. 17, 2015, and all the benefits accruing therefrom under 35 U.S.C. § 119, the entire contents of which are hereby incorporated by reference.

BACKGROUND

The invention herein relates to a curved display device and a method of manufacturing the same, and more particularly, to a curved display device including a pixel in which a plurality of domains is defined and a method of manufacturing the same.

Flat panel display devices are being used for displaying an image on various information processing apparatuses such as televisions, monitors, notebooks, mobile phones, and the like. Recently, curved display devices are being developed. The curved display devices may provide a display area having a curved shape to provide an image having an improved three dimensional effect such as senses of immersion and presence to a user.

SUMMARY

The invention provides a curved display device having improved display quality.

The invention also provides a method of manufacturing a curved display device having improved display quality.

Exemplary embodiments of the invention provide curved display devices. The curved display devices include a first substrate, a second substrate, a liquid crystal layer, a first alignment layer, and a second alignment layer. The second substrate faces the first substrate. The liquid crystal layer is disposed between the first and second substrates and includes liquid crystal molecules. The first alignment layer includes reactive mesogens that are polymerized with each other and is disposed between the first substrate and the liquid crystal layer. The second alignment layer is disposed between the liquid crystal layer and the second substrate. The reactive mesogens have a functional group having charges.

In exemplary embodiments, the curved display device may be flexible.

In other exemplary embodiments, the functional group may have positive charges.

In still other exemplary embodiments, the functional group may include alkali metal ions.

In even other exemplary embodiments, the functional group may have negative charges.

In yet other exemplary embodiments, the functional group may include halogen ions.

In further exemplary embodiments, the first substrate may include a first base substrate, a color filter disposed on the first base substrate, and a black matrix disposed on the first base substrate.

In other exemplary embodiments of the invention, methods of manufacturing a curved display device include providing a first substrate, providing a second substrate facing the first substrate, providing a liquid crystal composition, which includes reactive mesogens having a functional group having liquid crystal molecules and charges, between the first substrate and the second substrate, and providing light and electric fields to the liquid crystal composition to form a first alignment formation layer on the first substrate.

In some exemplary embodiments, methods may further include providing a power source unit including a first electrode part connected to the first substrate and a second electrode part connected to the second substrate.

In other exemplary embodiments, the functional group may have positive charges.

In still other exemplary embodiments, the forming the first alignment formation layer may include applying a first voltage to the first electrode part, and applying a second voltage that is greater than the first voltage to the second electrode part to apply the electric fields to the liquid crystal composition.

In even other exemplary embodiments, the forming the first alignment formation layer may include applying a negative voltage to the first electrode part, and grounding the second electrode part to apply the electric fields to the liquid crystal composition.

In yet other exemplary embodiments, the forming the first alignment formation layer may include grounding the first electrode part, and applying a positive voltage to the second electrode part to apply the electric fields to the liquid crystal composition.

In further exemplary embodiments, the functional group may include alkali metal ions.

In still further exemplary embodiments, the functional group may have negative charges.

In even further exemplary embodiments, the forming the first alignment formation layer may include applying a third voltage to the first electrode part, and applying a fourth voltage that is less than the third voltage to the second electrode part to apply the electric fields to the liquid crystal composition.

In yet further exemplary embodiments, the forming the first alignment formation layer may include applying a positive voltage to the first electrode part, and grounding the second electrode part to apply the electric fields to the liquid crystal composition.

In much further exemplary embodiments, the forming the first alignment formation layer may include grounding the first electrode part, and applying a negative voltage to the second electrode part to apply the electric fields to the liquid crystal composition.

In still much further exemplary embodiments, the functional group may include halogen ions.

In still other exemplary embodiments of the invention, curved display devices. The curved display devices include a first bent substrate, a second bent substrate, a liquid crystal layer, a first alignment layer, and a second alignment layer. The second bent substrate faces the first bent substrate. The liquid crystal layer is disposed between the first and second substrates and includes liquid crystal molecules. The first alignment layer includes reactive mesogens that are polymerized with each other and is disposed between the first bent substrate and the liquid crystal layer. The second alignment layer is disposed between the second substrate and the liquid crystal layer. First liquid crystal molecules, which are adjacent to the first alignment layer, of the liquid crystal molecules have a first pretilt-angle. Second liquid crystal molecules, which are adjacent to the second alignment layer, of the liquid crystal molecules have a second pretilt-angle that is different from the first pretilt-angle.

In some exemplary embodiments, the first pretilt-angle may be about 80° to about 90°.

In other exemplary embodiments, the second pretilt-angle may be about 88° to about 90°.

In still other exemplary embodiments, the first alignment layer may include a first base layer, and a first alignment formation layer. The first base layer may be disposed on the first bent substrate. The first alignment formation layer may be disposed on the first base layer and include the polymerized reactive mesogens. The first bent substrate may have a first curvature radius, and the second substrate may have a second curvature radius different from the first curvature radius.

In even other exemplary embodiments, the first bent substrate may include a first base substrate, and a pixel electrode disposed on the first base substrate. The second substrate may include a second base substrate, and a common electrode disposed on the second base substrate to face the pixel electrode.

In yet other exemplary embodiments, the pixel electrode may include a stem part, and a plurality of branch parts extending from the stem part. The domains may be divided by the stem part.

In further exemplary embodiments, the branch parts of each of the domains may extend parallel to each other, and the domains may extend in directions different from each other.

In still further exemplary embodiments, the domains may include a first domain, a second domain, a third domain, and a fourth domain.

In even further exemplary embodiments, the curved display devices may further include a first polarization plate, and a second polarization plate. The first polarization plate may be disposed under the first substrate and have a first transmission axis. The second polarization plate may be disposed on the second substrate and have a second transmission axis. Directions of the first and second transmission axes may be perpendicular to each other.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain principles of the invention. In the drawings.

DETAILED DESCRIPTION

Figure 1A:
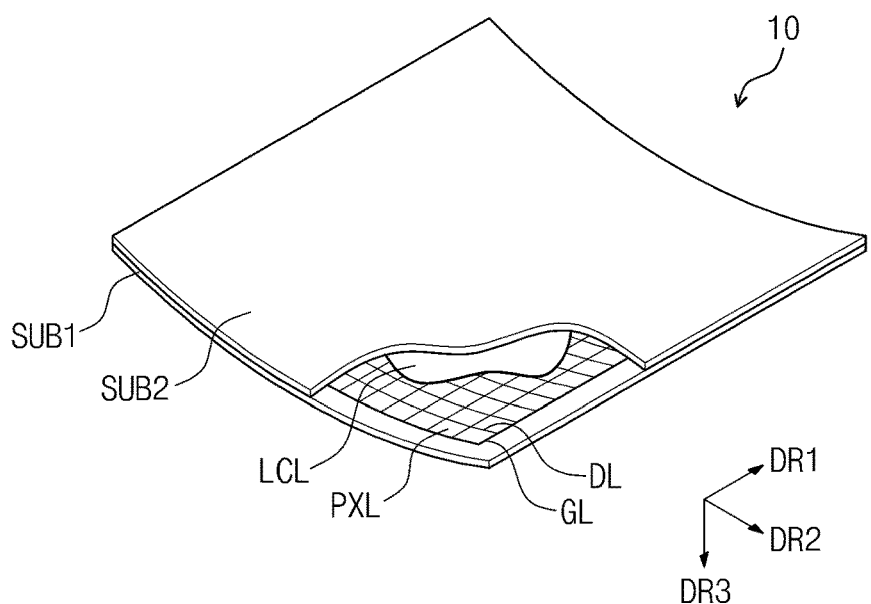
FIGS. 1A and 1B are schematic perspective views of an exemplary embodiment of a curved display device according to the invention.

The objects, other objectives, features, and advantages of the invention will be understood without difficulties through preferred embodiments below related to the accompanying drawings. The invention may, however, be embodied in different forms and should not be construed as limited to the embodiments set forth herein. Rather, these embodiments are provided so that this invention will be thorough and complete, and will fully convey the scope of the invention to those skilled in the art.

Like reference numerals refer to like elements throughout. In the drawings, the dimensions and size of each structure are exaggerated, omitted, or schematically illustrated for convenience in description and clarity. It will be understood that although the terms of first and second are used herein to describe various elements, these elements should not be limited by these terms. The terms are only used to distinguish one component from other components. In an exemplary embodiment, a first element referred to as a first element in one embodiment can be referred to as a second element in another embodiment. The terms of a singular form may include plural forms unless referred to the contrary.

The meaning of 'include' or 'comprise' specifies a property, a region, a fixed number, a step, a process, an element and/or a component but does not exclude other properties, regions, fixed numbers, steps, processes, elements and/or components. In the specification, it will be understood that when a layer (or film), a region, or a plate is referred to as being 'on' another layer, region, or plate, it can be directly on the other layer, region, or plate, or intervening layers, regions, or plates may also be present. On the contrary to this, it will be understood that when a layer (or film), a region, or a plate is referred to as being 'under' another layer, region, or plate, it can be directly under the other layer (or film), region, or plate, or intervening layers, regions, or plates may also be present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a curved display device according to an exemplary embodiment of the invention will be described.

Figure 1B:
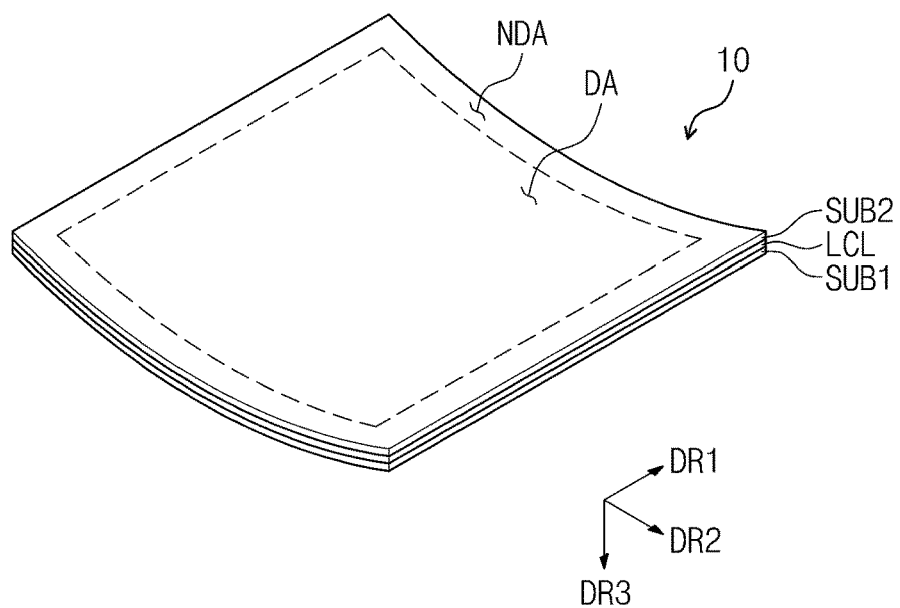
Figure 2:
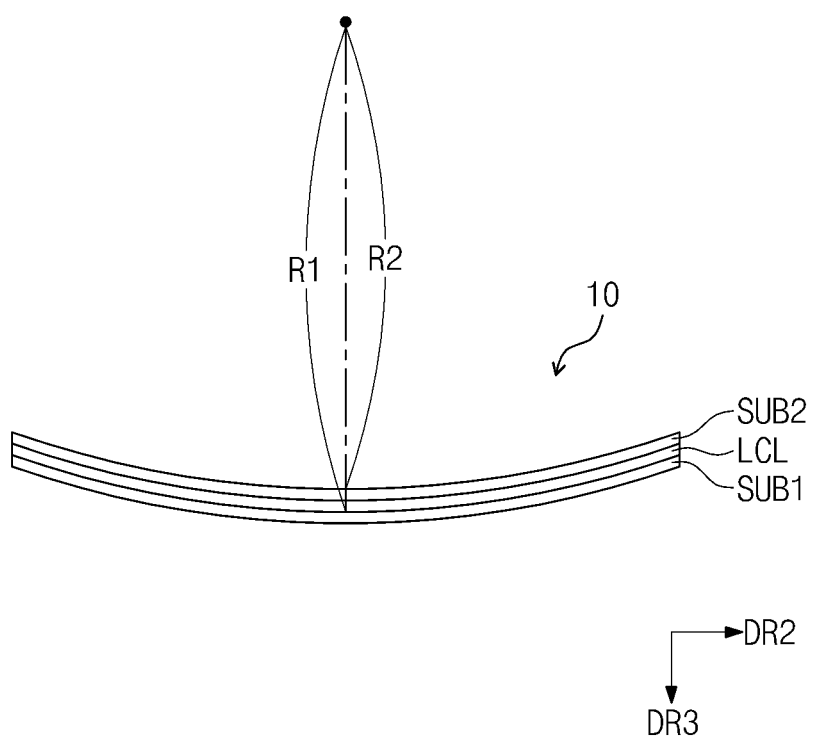
FIG. 2 is a schematic cross-sectional view of an exemplary embodiment of the curved display device according to the invention.

FIG. 1A is a schematic perspective view of a curved display device according to an exemplary embodiment of the invention. FIG. 1B is a schematic perspective view of the curved display device according to an exemplary embodiment of the invention. FIG. 2 is a schematic cross-sectional view of the curved display device according to an exemplary embodiment of the invention.

Referring to FIGS. 1A, 1B, and 2, a curved display device 10 includes a first substrate SUB1, a second substrate SUB2, and a liquid crystal layer LCL. The liquid crystal layer LCL is disposed between the first substrate SUB1 and the second substrate SUB2.

The curved display device 10 displays an image. The curved display device 10 includes a display area DA for displaying an image and a non-display area NDA on which an image is not displayed.

When viewed in a thickness direction DR3 of the curved display device 10, the display area DA may have an approximately rectangular shape, but is not limited thereto. The thickness direction DR3 may be a front direction of the curved display device 10 when viewed from user's eyes.

The display area DA includes a plurality of pixel areas PXL. In an exemplary embodiment, the pixel areas PXL may be defined by a plurality of gate lines GL and a plurality of data lines DL, for example. However, the invention is not limited thereto, and the pixel areas PXL may not be defined by a plurality of gate lines GL and a plurality of data lines DL. The plurality of pixel areas PXL may be arrayed in a matrix form. A pixel PX (see FIG. 3) may be disposed on each of the pixel areas PXL.

When viewed in the thickness direction DR3 of the curved display device 10, the non-display area NDA may, for example, surround the display area DA. The non-display area NDA may be adjacent to the display area DA in a first direction DR1 and a second direction DR2 perpendicular to the first direction DR1.

The curved display device 10 may be curved at a predetermined curvature/curvature radius. The curved display device 10 may be flexible or rigid.

The curved display device 10 may have a concavely curved shape when the user looks the curved display device 10 in the first direction DR1 or the second direction DR2. When the user sees an image displayed on a curved surface, the user may feel three dimensional effect and senses of immersion and presence. Although the curved display device 10 has the concave shape in FIGS. 1A and 1B when viewed in a thickness direction DR3 of the curved display device 10, the invention is not limited thereto. In an exemplary embodiment, when viewed in the first direction DR1 or the second direction DR2 of the curved display device 10, the curved display device 10 may have a convex shape, for example. The user may see the image displayed on the curved display device 10.

In an exemplary embodiment, the first substrate SUB1 may be curved. The first substrate SUB1 may have a first curvature radius R1. In an exemplary embodiment, the second substrate SUB2 may also be curved. The second substrate SUB2 may have a second curvature radius R2.

Figure 3:
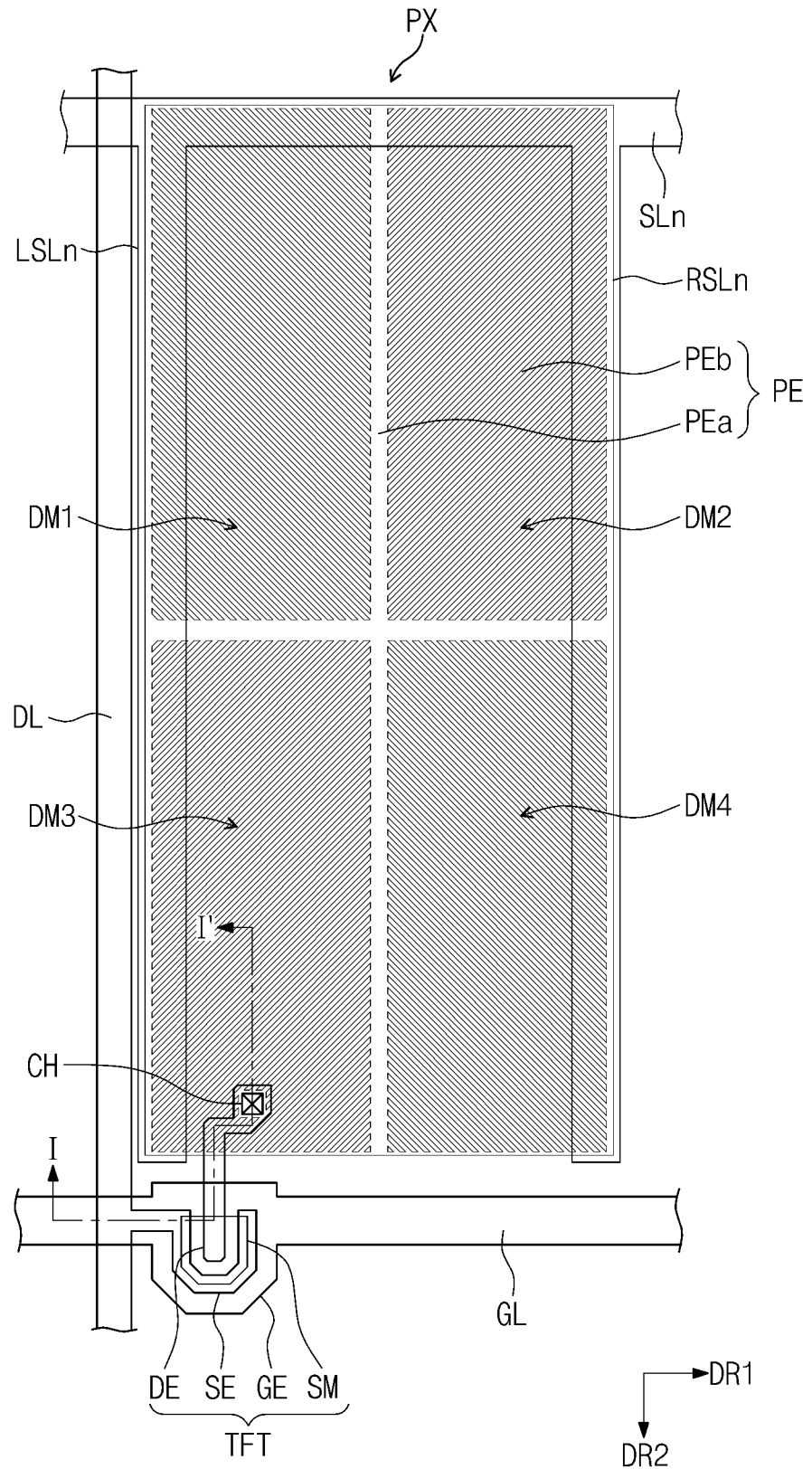
FIG. 3 is a schematic plan view illustrating an exemplary embodiment of one of pixels provided in the curved display device according to the invention.
Figure 4:
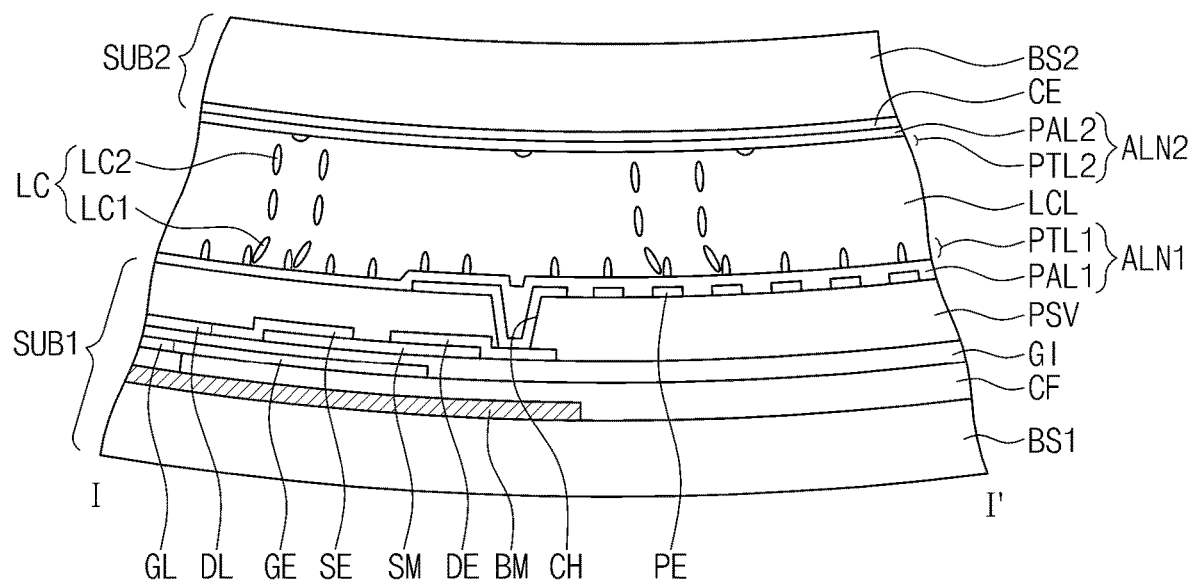
FIG. 4 is a cross-sectional view taken long line I-I' of FIG. 3.

FIG. 3 is a schematic plan view illustrating one of pixels provided in the curved display device according to an exemplary embodiment of the invention. FIG. 3 illustrates one pixel. Each of the rest pixels may have a structure similar to that of the pixel of FIG. 3. FIG. 4 is a cross-sectional view taken long line I-I' of FIG. 3. For convenience of description, the pixel illustrated in FIGS. 3 and 4 may be exaggerated, enlarged, or reduced when compared to its actual size.

Referring to FIGS. 1A, 1B, and 2 to 4, the curved display device 10 includes a first substrate SUB1, a first alignment layer ALN1 disposed on the first substrate SUB1, a second substrate SUB2 facing the first substrate SUB1, a second alignment layer ALN2 disposed on the second substrate SUB2, and a liquid crystal layer LCL disposed between the first alignment layer ALN1 and the second alignment layer ALN2.

The first substrate SUB1 may include a first base substrate BS1, a color filter layer CF, a black matrix BM, gate lines GL, data lines DL, and a plurality of pixels PX.

For convenience of description, FIG. 3 illustrates one pixel connected to one gate line of the gate lines GL and one data line of the data lines DL. However, the invention is not limited thereto. In another exemplary embodiment, the plurality of pixels may be connected to one gate line and one data line, for example. In an alternative exemplary embodiment, one pixel may be connected to the plurality of gate lines and the plurality of data lines. Hereinafter, one pixel PX will be exemplified.

In an exemplary embodiment, the first base substrate BS1 may be a polymer substrate, a plastic substrate, a glass substrate, or a quartz substrate, for example. In an exemplary embodiment, the first base substrate BS1 may be a transparent insulation substrate, for example. The first base substrate BS1 may be flexible or rigid.

The color filter CF is disposed on the first base substrate BS1 to provide a color. Although the first substrate SUB1 includes the color filter CF in the illustrated exemplary embodiment, the invention is not limited thereto. In another exemplary embodiment, the color filter CF may not be provided in the first substrate SUB1, but be provided in the second substrate SUB2.

The black matrix BM is disposed to correspond to a light blocking area of the first substrate SUB1. The blocking area may be defined as an area on which the data lines DL, a thin film transistor TFT, and the gate lines GL are disposed. Since a pixel electrode PE is not generally disposed on the light blocking area, liquid crystal molecules may not be aligned to cause light leakage. Thus, the black matrix BM may be disposed on the light blocking area to prevent the light leakage from occurring. Although the first substrate SUB1 includes the black matrix BM in the illustrated exemplary embodiment, the invention is not limited thereto. In an exemplary embodiment, the black matrix BM may not be provided in the first substrate SUB1, but be provided in the second substrate SUB2.

Although not shown, an insulation layer (not shown) may be disposed on the color filter CF and the black matrix BM.

The gate line GL extends in the first direction DR1 on the color filter CF and the black matrix BM. Although the gate lines GL, the data lines DL, and the thin film transistor TFT are disposed on the color filter CF and the black matrix BM in the illustrated exemplary embodiment, the invention is not limited thereto. In another exemplary embodiment, the color filter CF and the black matrix BM may be disposed on the gate lines GL, the data lines DL, and the thin film transistor TFT.

The data lines DL extends in the second direction DR2 crossing the first direction DR1 with the gate line GL and a gate insulation layer GI may be disposed between the gate line GL and the data line DL. In an exemplary embodiment, the gate insulation GI may be disposed on a front surface of the color filter CF to cover the gate lines GL.

The pixel PX includes the thin film transistor TFT and the pixel electrode PE and a storage electrode part which are connected to the thin film transistor TFT. The thin film transistor TFT includes the gate electrode GE, the gate insulation layer GI, a semiconductor pattern SM, a source electrode SE, and a drain electrode DE. The storage electrode part further include a storage line SLn extending in the first direction DR1 and first and second branch electrodes LSLn and RSLn which are branched from the storage line SLn to extend in the second direction DR2.

The gate electrode GE may protrude from the gate lines GL or be disposed on a portion of the gate lines GL. In an exemplary embodiment, the gate electrode GE may include a metal, for example. In an exemplary embodiment, the gate electrode GE may include one of nickel, chrome, molybdenum, aluminum, titanium, copper, tungsten, and an alloy thereof, for example. The gate electrode GE may have a single-layered or multi-layered structure using the metal. In an exemplary embodiment, the gate electrode GE may have a triple-layered structure in which molybdenum, aluminum, and molybdenum are sequentially stacked with each other or a double-layered structure in which titanium and copper are sequentially stacked with each other, for example. In an alternative exemplary embodiment, the gate electrode GE may have a single-layered structure including an alloy of titanium and copper, for example.

The semiconductor pattern SM is disposed on the gate insulation layer GI. The semiconductor pattern SM is disposed on the gate electrode GE with the gate insulation layer GI therebetween. A portion of the semiconductor pattern SM overlaps the gate electrode GE. The semiconductor pattern SM includes an active pattern (not shown) disposed on the gate insulation layer GI and an ohmic contact layer (not shown) disposed on the active pattern. In an exemplary embodiment, the active pattern may include an amorphous silicon thin film, for example. In an exemplary embodiment, the ohmic contact layer may be an n+ amorphous silicon thin film, for example. In an exemplary embodiment, the ohmic contact layer may allow the active pattern to ohmic-contact the source electrode SE and the drain electrode DE.

The source electrode SE is branched from the data line DL. The source electrode SE is disposed on the ohmic contact layer to partially overlap the gate electrode GE. The drain electrode DE and the source electrode SE are spaced apart from each other with the semiconductor pattern SM therebetween. The drain electrode DE is disposed on the ohmic contact layer to partially overlap the gate electrode GE.

In an exemplary embodiment, each of the source electrode SE and the drain electrode DE may include one of nickel, chrome, molybdenum, aluminum, titanium, copper, tungsten, and an alloy thereof, for example. Each of the source electrode SE and the drain electrode DE may have a single-layered or multi-layered structure using the metal. In an exemplary embodiment, each of the source electrode SE and the drain electrode DE may have a double-layered structure in which titanium and copper are sequentially stacked with each other, for example. In an alternative exemplary embodiment, each of the source electrode SE and the drain electrode DE may have a single-layered structure including an alloy of titanium and copper, for example.

Thus, a top surface of the active pattern between the source electrode SE and the drain electrode DE is exposed, and a channel part forming a conductive channel is defined between the source electrode SE and the drain electrode DE according to whether a voltage is applied into the gate electrode GE. The source electrode SE and the drain electrode DE partially overlap the semiconductor pattern SM in an area except the channel part defined by spacing the source electrode SE from the drain electrode DE.

The pixel electrode PE is connected to the drain electrode DE with a protection layer PSV therebetween. The pixel electrode PE partially overlaps the storage line SLn and the first and second branch electrodes LSLn and RSLn to form a storage capacitor.

The protection layer PSV covers the source electrode SE, the drain electrode DE, the channel part, and the gate insulation layer GI, and a contact hole CH for exposing a portion of the drain electrode DE is defined in the protection layer PSV. In an exemplary embodiment, the protection layer PSV may include silicon nitride or silicon oxide, for example.

The pixel electrode PE is connected to the drain electrode DE through the contact hole CH defined in the protection layer PSV. In an exemplary embodiment, the pixel electrode PE includes a transparent conductive material, for example. In the exemplary embodiment, the pixel electrode PE includes transparent conductive oxide, for example. In an exemplary embodiment, the transparent conductive oxide may include indium tin oxide ("ITO"), indium zinc oxide ("IZO"), and indium tin zinc oxide ("ITZO"), for example.

The pixel electrode PE includes a stem part PEa and a plurality of branch parts PEb radially protruding to extend from the stem part PEa. The stem part PEa or a portion of the branch parts PEb are connected to the drain electrode DE through the contact hole CH.

The stem part PEa may have various shapes. In an exemplary embodiment, the stem part PEa may have a cross shape as shown in the illustrated exemplary embodiment of the invention. The plurality of branch parts PEb are spaced from the branch parts PEb adjacent to each other without meeting each other to extend in a direction parallel to each other within an area divided by the stem part PEa. In an exemplary embodiment, the branch parts PEb are spaced apart from each other by a micrometer unit. This corresponds to a unit for aligning the liquid crystal molecules of the liquid crystal layer LCL at a specific azimuth.

The pixel PX may be divided into a plurality of domains DM1, DM2, DM3, and DM4 by the stem part PEa. The branch parts PEb may respectively correspond to the domains DM1, DM2, DM3, and DM4 to extend in directions different from each other on the domains DM1, DM2, DM3, and DM4. Although the pixel PX includes four domains in the illustrated exemplary embodiment of the invention, the invention is not limited thereto. In an exemplary embodiment, the pixel PX may include various numbers of domains such as two, six, or eight domains.

The first alignment layer ALN1 is disposed on the pixel electrode PE. The first alignment layer ALN1 may pretilt the liquid crystal molecules LC of the liquid crystal layer LCL. The first alignment layer ALN1 will be described below in detail.

The second substrate SUB2 includes a second base substrate BS2 and a common electrode CE. In an exemplary embodiment, the second base substrate BS2 may be a polymer substrate, a plastic substrate, a glass substrate, or a quartz substrate, for example. In an exemplary embodiment, the second base substrate BS2 may be a transparent insulation substrate. The second base substrate BS2 may be flexible or rigid.

A common electrode CE is disposed on the second base substrate BS2. In an exemplary embodiment, the common electrode CE together with the pixel electrode PE may generate electric fields to drive the liquid crystal layer LCL. Although the second substrate SUB2 includes the common electrode CE in the current exemplary embodiment, the invention is not limited thereto. In another exemplary embodiment, the common electrode CE may not be provided in the second substrate SUB2, but be provided in the first substrate SUB1. In an exemplary embodiment, the common electrode CE may include a transparent conductive material, for example. In an exemplary embodiment, the common electrode CE may include conductive metal oxide such as ITO, IZO, or ITZO. A second alignment layer ANL2 covering the common electrode CE is disposed on the second base substrate BS2. The second alignment layer ALN2 will be described below in detail.

The liquid crystal layer LCL including the liquid crystal molecules is disposed between the first and second substrates SUB1 and SUB2. The liquid crystal molecules are not specifically limited when the liquid crystal molecules are commonly used. In an exemplary embodiment, the liquid crystal molecules may include alkenyl-based liquid crystal molecules and alkoxy-based liquid crystal molecules, for example.

Figure 5A:
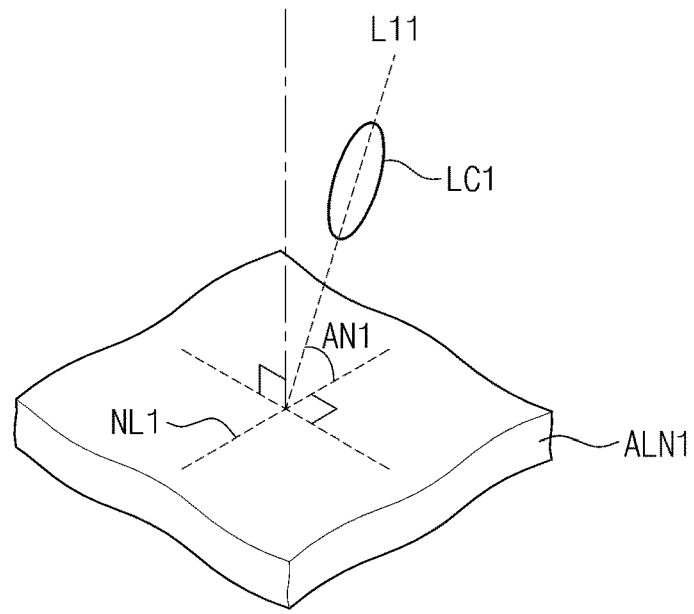
FIG. 5A is a schematic perspective view of a first pretilt-angle of first liquid crystal molecules.
Figure 5B:
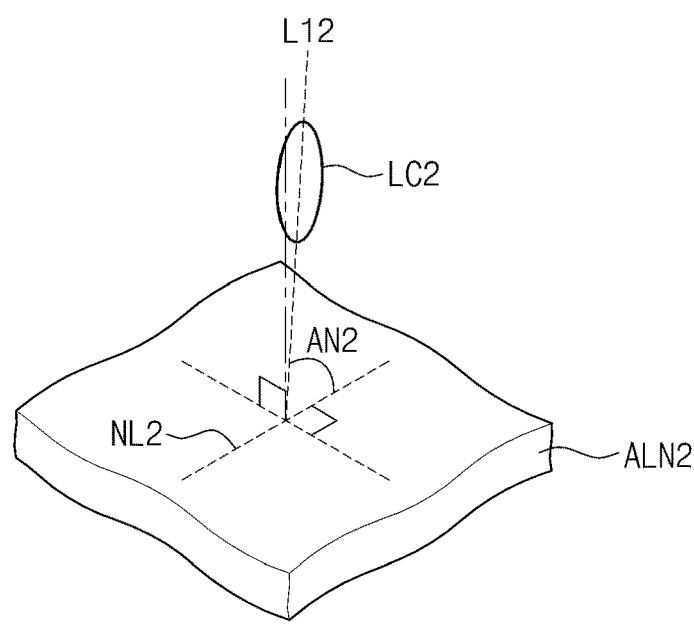
FIG. 5B is a schematic perspective view of a second pretilt-angle of second liquid crystal molecules.

FIG. 5A is a schematic perspective view of a first pretilt-angle of first liquid crystal molecules. FIG. 5B is a schematic perspective view of a second pretilt-angle of second liquid crystal molecules. Hereinafter, first and second alignment layers ALN1 and ALN2 will be described in more detail.

The first alignment layer ALN1 includes reactive mesogens RM (see FIG. 9) that are polymerized with each other. Thus, the first alignment layer ALN1 may pretilt the first liquid crystal molecules LC1, which are adjacent to the first alignment layer ALN1, of the liquid crystal molecules LC of the liquid crystal layer LCL. The first liquid crystal molecules LC1 may have a first pretilt-angle AN1 with respect to the first alignment layer ALN1.

The second alignment layer ALN2 is disposed on the common electrode CE. The second alignment layer ALN2 may not nearly include the reactive mesogens that are polymerized with each other. Thus, the second alignment layer ALN2 may not substantially pretilt the second liquid crystal molecules LC2, which are adjacent to the second alignment layer ALN2, of the liquid crystal molecules LC of the liquid crystal layer LCL.

Referring to FIG. 5A, for example, an angle defined by a first line NL1 provided in one surface of the first alignment layer ALN1 and a long axis L11 of the first liquid crystal molecules LC1 may be defined as the first pretilt-angle AN1. In an exemplary embodiment, the first pretilt-angle AN1 may be a mean value or representative value of pretilt-angles of the first liquid crystal molecules LC1, for example. In an exemplary embodiment, the first pretilt-angle AN1 may be an angle of about 80 degrees)(° to about 90°. In an exemplary embodiment, the first pretilt-angle AN1 may be an angle of about 80° to about 89°, for example. In an exemplary embodiment, the first pretilt-angle AN1 may be greater than an angle of about 80° or less than an angle of about 88°, for example, so that the first pretilt-angle is different from a second pretilt-angle AN2 that will be described later.

Referring to FIGS. 4 and 5A, the first alignment layer ALN1 includes a first base layer PAL1 disposed on the pixel electrode PE and a second alignment formation layer PTL1 disposed on the first base layer PAL'. The first base substrate PAL1 is not specifically limited to a material thereof when the material for forming the base substrate BS is commonly used. In an exemplary embodiment, the first base substrate PAL1 may include polymers such as polyimide, poly(amic acid), polyamide, poly(amic imide), polyester, polyethylene, polyurethane, or polystyrene, combination of the polymers, or a monomer of the polymers.

The first alignment formation layer PTL1 includes reactive mesogens RM that are polymerized with each other. The first alignment formation layer PTL1 may be a portion for substantially pretilting the liquid crystal molecules LC of the first alignment layer ALN1. The term "reactive mesogen" may represent photocurable particles, i.e., a photo cross-linkable low-molecule or high-molecule copolymer. In an exemplary embodiment, when light having a specific wavelength, for example, ultraviolet rays are applied, chemical reaction such as polymerization reaction may occur in the reactive mesogen. The reactive mesogens RM may be partially cross-linked to pretilt the liquid crystal molecules LC so that each of the liquid crystal molecules LC has a predetermined tilt angle with respect to one surface of the first substrate SUB1.

The reactive mesogens RM are not specifically limited when reactive mesogens RM are commonly used. In an exemplary embodiment, the reaction mesogens RM may include at least one of acrylate, methacrylate, epoxy, oxetane, vinyl ether, styrene, and derivatives thereof, for example.

The reactive mesogens RM may have a polarity. In an exemplary embodiment, the reactive mesogens RM may include a functional group having charges. The reactive mesogens RM may generally have a positive polarity by the functional group having a large positive charge or may generally have a negative polarity by the functional group having a large negative charge. Since the reactive mesogens RM has the specific polarity, while first and second alignment formation layers PTL1 and PTL2 are provided, the first and second alignment formation layers PTL1 and PTL2 which have a large difference in polarization amount of the reactive mesogens RM therebetween may be provided. In an exemplary embodiment, the first alignment formation layer PTL1 may include reactive mesogens RM of which a more amount is polymerized when compared to that of the second alignment formation layer PTL2. Thus, the first alignment formation layer PTL1 may pretilt the first liquid crystal molecules LC1 adjacent to the first base layer PAL1 so that the first liquid crystal molecules LC1 has a predetermined tilt angle with respect to one surface of the first substrate SUB1.

In an exemplary embodiment, the functional group having the positive charges may be, for example, hydrogen ions or ammonium ions. In an alternative exemplary embodiment, the function group having the positive charges may be, for example, lithium ions, sodium ions, or potassium ions. In an exemplary embodiment, the functional group having the negative charges may be, for example, a carboxyl group. In an alternative exemplary embodiment, the functional group having the negative charges may include halogen ions. In an exemplary embodiment, the functional group having the negative charges may include fluoride ions, chloride ions, brominate ions, or iodide ions, for example.

Referring to FIGS. 4 and 5B, the second alignment layer ALN2 include a second base layer PAL2 disposed on the common electrode CE and a second alignment formation layer PTL2 disposed on the second base layer PAL2. The second base substrate PAL2 is not specifically limited to a material thereof when the material for forming the base substrate BS is commonly used. In an exemplary embodiment, the first base substrate PAL1 may include polymers such as polyimide, poly(amic acid), polyamide, poly(amic imide), polyester, polyethylene, polyurethane, or polystyrene, combination of the polymers, or a monomer of the polymers.

The second alignment formation layer PTL2 includes the reactive mesogens RM of which a relatively small amount is polymerized when compared to that of the first alignment formation layer PTL1. In an exemplary embodiment, the second alignment formation layer PTL2 may include a very small amount of reactive mesogens RM as an absolute amount. Substantially, the second alignment layer PTL2 may not include the reactive mesogens RM that are polymerized with each other. Herein, the term "the second alignment layer PTL2 may not include the reactive mesogens RM" may refer to a state in which a very small amount of reactive mesogens RM is combined with the second alignment layer PTL2 in consideration of errors on processes of providing light and electric fields to the liquid crystal composition (see FIGS. 8 and 10).

In an exemplary embodiment, the second alignment formation layer PTL2 does not pretilt the second liquid crystal molecules LC2 so the second liquid crystal molecules LC2 does not have a predetermined angle with respect to one surface of the second substrate SUB2. Thus, the second liquid crystal molecules LC2 adjacent to the second base layer PAL2 may not have specific directivity, and may be randomly disposed on the second alignment layer ALN2. In a state where electric fields are applied to the liquid crystal layer LCL, the second liquid crystal molecules LC2 may be arranged on the second alignment layer ALN2 in a direction perpendicular to the second alignment layer ALN2.

In an exemplary embodiment, the second liquid crystal molecules LC2 may have a second pretilt-angle AN2 with respect to the second alignment layer ALN2. Referring to FIG. 5B, an angle defined by a second line NL2 provided in one surface of the second alignment layer ALN2 and a long axis L12 of the second liquid crystal molecules LC2 may be defined as the second pretilt-angle AN2. The second pretilt-angle AN2 may be different from the first pretilt-angle AN1 and also be significantly less than that of the first pretilt-angle AN1. In an exemplary embodiment, the second pretilt-angle AN2 may be a mean value or representative value of pretilt-angles of the second liquid crystal molecules LC2. In an exemplary embodiment, the second pretilt-angle AN2 may be an angle of about 88° to about 90°, for example. In an exemplary embodiment, the second pretilt-angle AN2 may be greater than that of about 89° or less than that of about 90°, for example. In an exemplary embodiment, the second pretilt-angle AN2 may be greater than the first pretilt-angle AN1 within a range of an angle of about 88° to about 90°, for example. When the first pretilt-angle AN1 is set to an angle of about 80°, about 85°, about 86°, or about 89° according to an exemplary embodiment of the invention, the second pretilt-angle AN2 may be set to an angle of about 89.5° or about 90° that is greater than that of the first pretilt-angle AN1, for example.

Figure 6A:
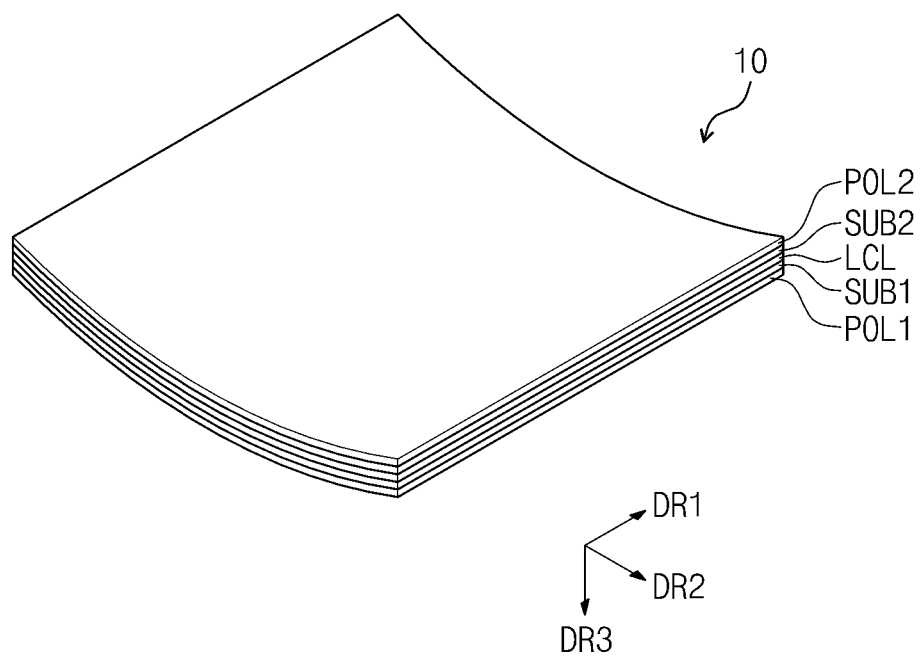
FIG. 6A is a schematic perspective view of an exemplary embodiment of the curved display device according to the invention.
Figure 6B:
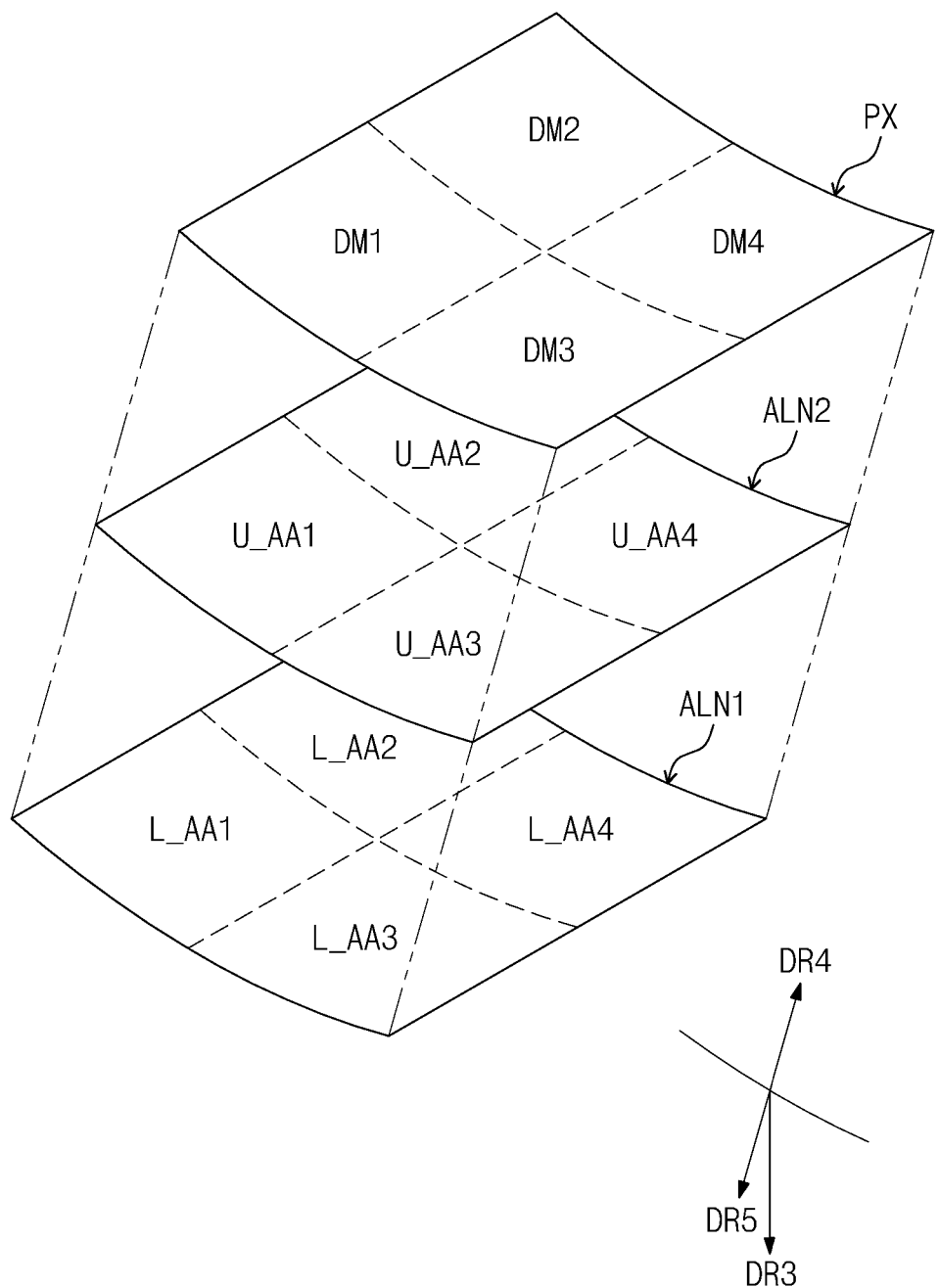
FIG. 6B is a schematic perspective view of an exemplary embodiment of a pixel and first and second alignment layers corresponding to the pixel according to the invention.
Figure 6C:
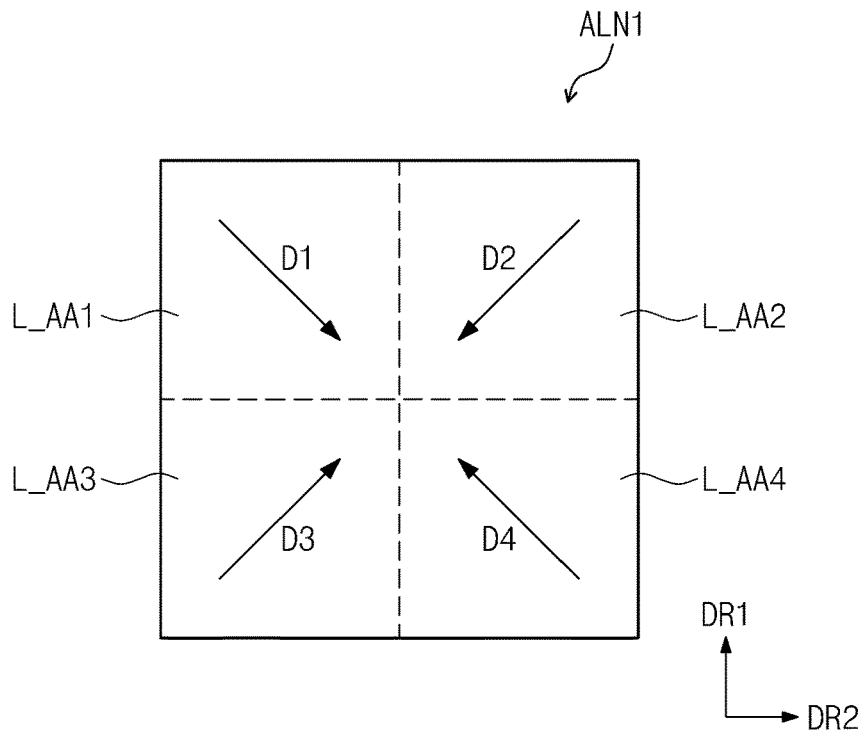
FIG. 6C is a schematic plan view of the first alignment layer when viewed in a direction DR5 of FIG. 6B.
Figure 6D:
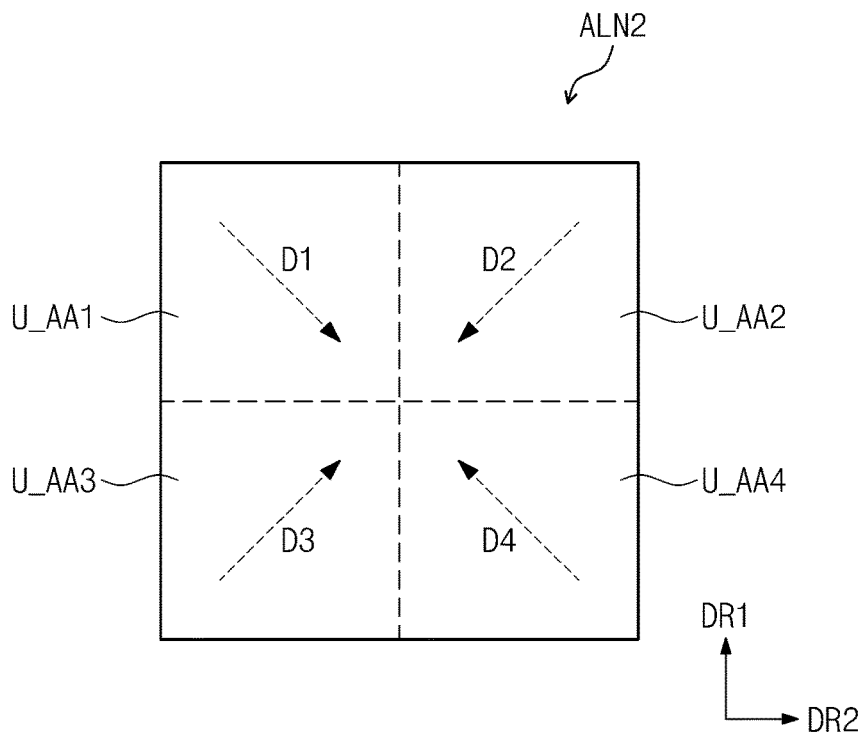
FIG. 6D is a schematic plan view of the second alignment layer when viewed in the direction DR5 of FIG. 6B.
Figure 6E:
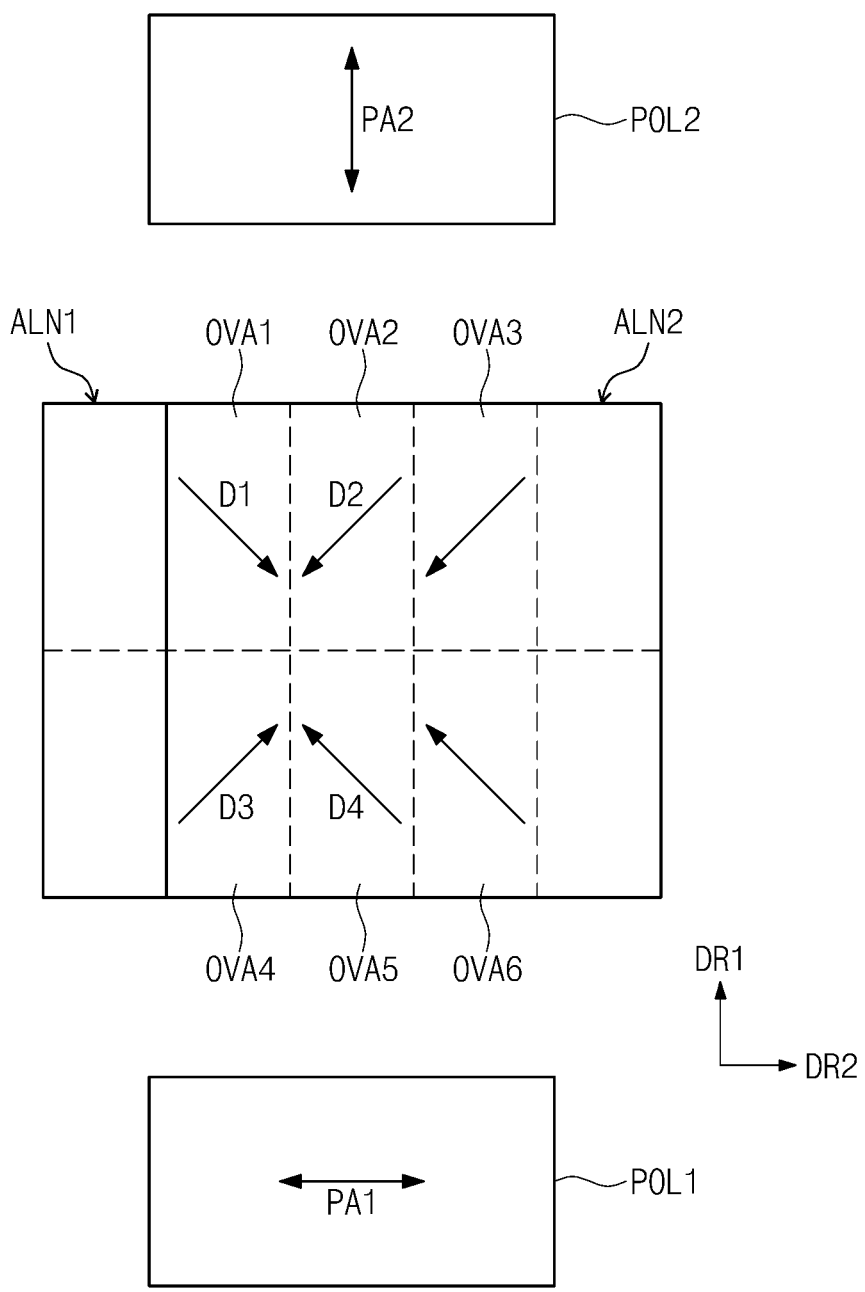
FIG. 6E is a schematic plane view of an overlapping area between the first and second alignment layers, a lower polarization plate, and an upper polarization plate when viewed in a direction DR3 of FIG. 6B.
Figure 6F:
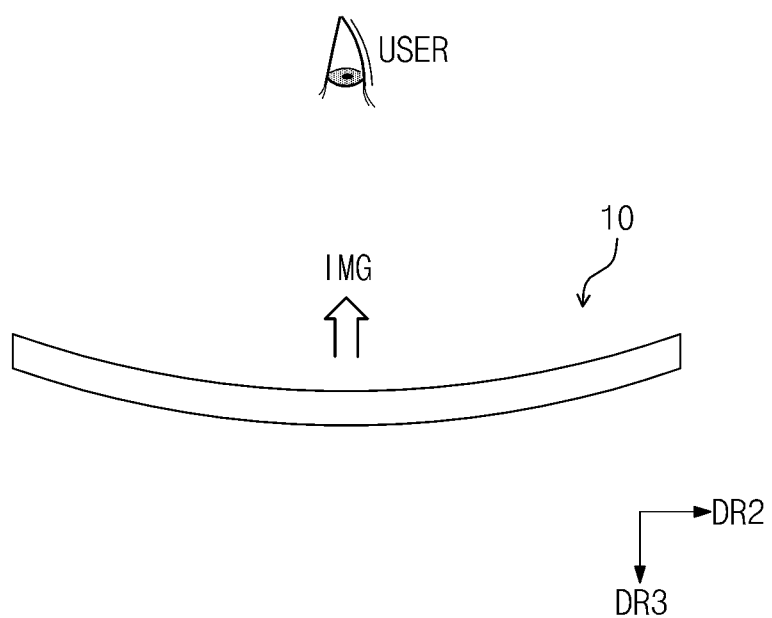
FIG. 6F is a schematic view illustrating an exemplary embodiment of a state in which a user recognizes an image displayed on the curved display device according to the invention.

FIG. 6A is a schematic perspective view of the curved display device according to an exemplary embodiment of the invention. FIG. 6B is a schematic perspective view of a pixel and the first and second alignment layers corresponding to the pixel according to an exemplary embodiment of the invention. FIG. 6C is a schematic view of the first alignment layer when viewed in a direction DR5 of FIG. 6B. FIG. 6D is a schematic plan view of the second alignment layer when viewed in the direction DR5 of FIG. 6B. FIG. 6E is a schematic plane view illustrating an overlapping area between the first and second alignment layers, a lower polarization plate, and an upper polarization plate when viewed in the direction DR3 of FIG. 6B. FIG. 6F is a schematic view illustrating a state in which a user recognizes an image IMG displayed on the curved display device according to an exemplary embodiment of the invention. FIG. 6E further illustrates a lower polarization plate POL1 disposed on the first substrate SUB1 (See FIG. 4) and an upper polarization plate POL2 disposed on the second substrate SUB2 (See FIG. 4). Referring to FIGS. 6A to 6D, the first alignment layer ALN1 includes lower alignment areas L_AA1, L_AA2, L_AA3, and L_AA4. The lower alignment areas L_AA1, L_AA2, L_AA3, and L_AA4 include a first lower alignment area L_AA1, a second lower alignment area L_AA2, a third lower alignment area L_AA3, and a fourth lower alignment area L_AA4. The lower alignment areas L_AA1, L_AA2, L_AA3, and L_AA4 may correspond to respectively overlap the domains DM1, DM2, DM3, and DM4 in a direction DR5 opposite to a normal direction DR4 of the pixel PX.

The first liquid crystal molecules LC1 (see FIG. 4) are pretilted by the reactive mesogens RM (see FIG. 9) that are polymerized with each other on each of the first lower alignment area L_AA1, the second lower alignment area L_AA2, the third lower alignment area L_AA3, and the fourth lower alignment area L_AA4 respectively corresponding to the first domain DM1, the second domain DM2, the third domain DM3, and the fourth domain DM4. As the electric fields are generated in the liquid crystal layer LCL, the pretilted liquid crystal molecules may be quickly aligned in a parallel direction than the liquid crystal molecules that are not pretilted. That is, the liquid crystal molecules may be quickly rearranged from a vertically aligned state to a parallely aligned state.

When the electric fields are applied to the liquid crystal layer LCL, the pretilted first liquid crystal molecules LC1 (see FIG. 4) may be aligned in a direction parallel to the extension direction of the branch parts PEb (see FIG. 3) on the first lower alignment area L_AA1. The extension direction of the branch parts PEb (see FIG. 3) may be substantially parallel to a first sub direction D1. The first sub direction D1 may represent a mean direction of parallely aligned directions when the first liquid crystal molecules LC1 (see FIG. 4) are parallely aligned on the first lower alignment area L_AA1.

Similarly, when the electric fields are applied to the liquid crystal layer LCL, the first liquid crystal molecules LC1 (see FIG. 4) may be aligned in a second sub direction D2 on the second lower alignment area L_AA2, be aligned in a third sub direction D3 on a third lower alignment area L_AA3, and be aligned in a fourth sub direction D4 on a fourth lower alignment area L_AA4. The second sub direction D2 may represent a mean direction of parallely aligned directions when the first liquid crystal molecules LC1 (see FIG. 4) are parallely aligned on the second lower alignment area L_AA2. The third sub direction D3 may represent a mean direction of parallely aligned directions when the first liquid crystal molecules LC1 (see FIG. 4) are parallely aligned on the third lower alignment area L_AA3. The fourth sub direction D4 may represent a mean direction of parallely aligned directions when the first liquid crystal molecules LC1 (see FIG. 4) are parallely aligned on the fourth lower alignment area L_AA4.

The second alignment layer ALN2 includes upper alignment areas U_AA1, U_AA2, U_AA3, and U_AA4. The upper alignment areas U_AA1, U_AA2, U_AA3, and U_AA4 include a first upper alignment area U_AA1, a second upper alignment area U_AA2, a third upper alignment area U_AA3, and a fourth upper alignment area U_AA4. The upper alignment areas U_AA1, U_AA2, U_AA3, and U_AA4 may correspond to respectively overlap the domains DM1, DM2, DM3, and DM4 in a direction DR5 opposite to a normal direction DR4 of the pixel PX.

Substantially, the second alignment layer ALN2 may not include the reactive mesogens RM (see FIG. 9) that are polymerized with each other. Thus, the second liquid crystal molecules LC2 (see FIG. 4) are not substantially pretilted, but are randomly disposed without having the specific directivity on each of the first, second, third, and fourth upper alignment areas U_AA1, U_AA2, U_AA3, and U_AA4.

When the electric fields are applied to the liquid crystal layer LCL, the second liquid crystal molecules LC2 (see FIG. 4) may be randomly aligned in the parallel direction. However, the second liquid crystal molecules LC2 (see FIG. 4) may have directivity parallel to the first sub direction D1 by effects of the pretilted first liquid crystal molecules LC1 (see FIG. 4) and the branch parts PEb (see FIG. 3). When a degree of the first liquid crystal molecules LC1 of the first lower alignment area L_AA1, which are arranged in the first sub direction D1 is defined as a first scalar value, and a degree of the second liquid crystal molecules LC2 of the first upper alignment area U_AA1, which are arranged in the first sub direction D1 is defined as a second scalar value, the second scalar value may be significantly less than the first scalar value. Since the second liquid crystal molecules LC2 (see FIG. 4) are not substantially pretilted, a parallely aligned rate of the second liquid crystal molecules LC2 (see FIG. 4) on the first upper alignment area U_AA1 may be significantly less than that of the first liquid crystal molecules LC1 (see FIG. 4) on the first lower alignment area L_AA1. In an exemplary embodiment, the number of second liquid crystal molecules LC2 (see FIG. 4) that are aligned in parallel to the first sub direction D1 may be significantly less than that of first liquid crystal molecules LC1 (see FIG. 4) that are aligned in parallel to the first sub direction D1.

Similarly, when the electric fields are applied to the liquid crystal layer LCL, the second liquid crystal molecules LC2 (see FIG. 4) may be weakly aligned in the second sub direction D2 on the second upper alignment area U_AA2, be weakly aligned in the third sub direction D3 on the third upper alignment area U_AA3, and be weakly aligned in the fourth sub direction D4 on the fourth upper alignment area U_AA4.

Referring to FIGS. 6A to 6E, when viewed in the third direction DR3, the first and second alignment layers ALN1 and ALN2 have overlapping areas OVA1, OVA2, OVA3, OVA4, OVA5, and OVA6. The overlapping areas OVA1, OVA2 OVA3, OVA4, OVA5, and OVA6 include a first overlapping area OVA1, a second overlapping area OVA2, a third overlapping area OVA3, a fourth overlapping area OVA4, a fifth overlapping area OVA5, and a sixth overlapping area OVA6.

When the electric fields are applied to the liquid crystal layer LCL, an optical axis direction of the liquid crystal layer LCL may be equal to a mean value of the parallely aligned direction of the first liquid crystal molecules LC1 (see FIG. 4) on the lower alignment areas L_AA1, L_AA2, L_AA3, and L_AA4 and the parallely aligned direction of the second liquid crystal molecules LC2 (see FIG. 4) on the upper alignment areas U_AA1, U_AA2, U_AA3, and U_AA4.

The second overlapping area OVA2 may be an area on which the second lower alignment area L_AA2 and the first upper alignment area U_AA1 overlap each other. Since the second liquid crystal molecules LC2 (see FIG. 4) are not substantially pretilted, and the first liquid crystal molecules LC1 (see FIG. 4) are pretilted, a parallely aligned rate of the second liquid crystal molecules LC2 (see FIG. 4) on the first overlapping area OVA1 may be significantly less than that of the first liquid crystal molecules LC1 (see FIG. 4) on the first overlapping area OVA1. In an exemplary embodiment, the number of second liquid crystal molecules LC2 (see FIG. 4) that are aligned in parallel to the second sub direction D2 may be significantly less than that of first liquid crystal molecules LC1 (see FIG. 4) that are aligned in parallel to the first sub direction D1.

Thus, when the electric fields are applied to the liquid crystal layer LCL, the optical axis direction of the liquid crystal layer LCL on the second overlapping area OVA2 may be substantially parallel to the second sub direction D2. Similarly, when the electric fields are applied to the liquid crystal layer LCL, an optical axis direction of the liquid crystal layer LCL on the fifth overlapping area OVA5 may be substantially parallel to the fourth sub direction D4.

The parallely aligned direction of the first liquid crystal molecules LC1 (see FIG. 4) on the first overlapping area OVA1 may be the substantially same as that of the second liquid crystal molecules LC2 (see FIG. 4). Thus, an optical axis direction of the liquid crystal layer LCL on the first overlapping area OVA1 is substantially parallel to the first sub direction D1. Similarly, an optical axis direction of the liquid crystal layer LCL on the third overlapping area OVA3 is substantially parallel to the second sub direction D2, an optical axis direction of the liquid crystal layer LCL on the fourth overlapping area OVA4 is substantially parallel to the third sub direction D3, and an optical axis direction of the liquid crystal layer LCL on the sixth overlapping area OVA6 is substantially parallel to the fourth sub direction D4.

The lower polarization plate POL1 has a first transmission axis PA1, and the upper polarization plate POL2 has a second transmission axis PA2. The first transmission axis PA1 and the second transmission axis PA2 are perpendicular to each other. In an exemplary embodiment, when the first transmission axis PA1 is parallel to the second direction DR2, the second transmission axis PA2 is parallel to the first direction DR1. For convenience of description, FIG. 6E illustrates the lower and upper polarization plates POL1 and POL2 each of which has a size relatively less than that of each of the first and second alignment layers ALN1 and ALN2. Referring to FIGS. 6A to 6F, the optical axis direction of the liquid crystal layer LCL is not parallel to the directions of the first transmission axis PA1 of the lower polarization plate POL1 and the second transmission axis PA2 of the upper polarization plate POL2 within each of the first, second, third, fourth, fifth, and sixth overlapping areas OVA1, OVA2 OVA3, OVA4, OVA5, and OVA6 of the curved display device 10 according to an exemplary embodiment of the invention. Thus, the user USER may see light passing through the first, second, third, fourth, fifth, and sixth overlapping areas OVA1, OVA2 OVA3, OVA4, OVA5, and OVA6.

Figure 7A:
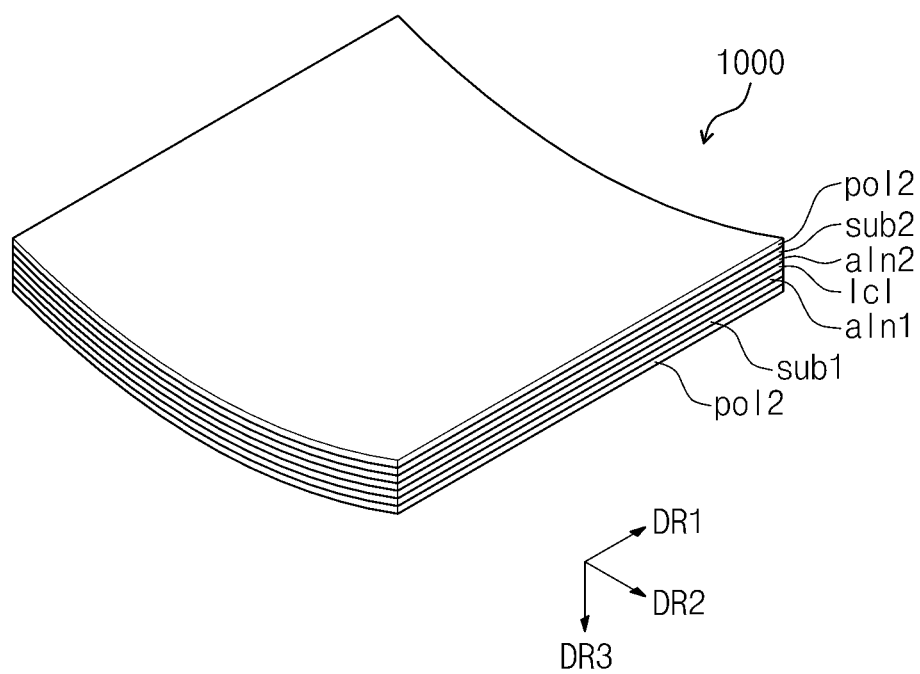
FIG. 7A is a schematic perspective view of a curved display device according to a comparison example.
Figure 7B:
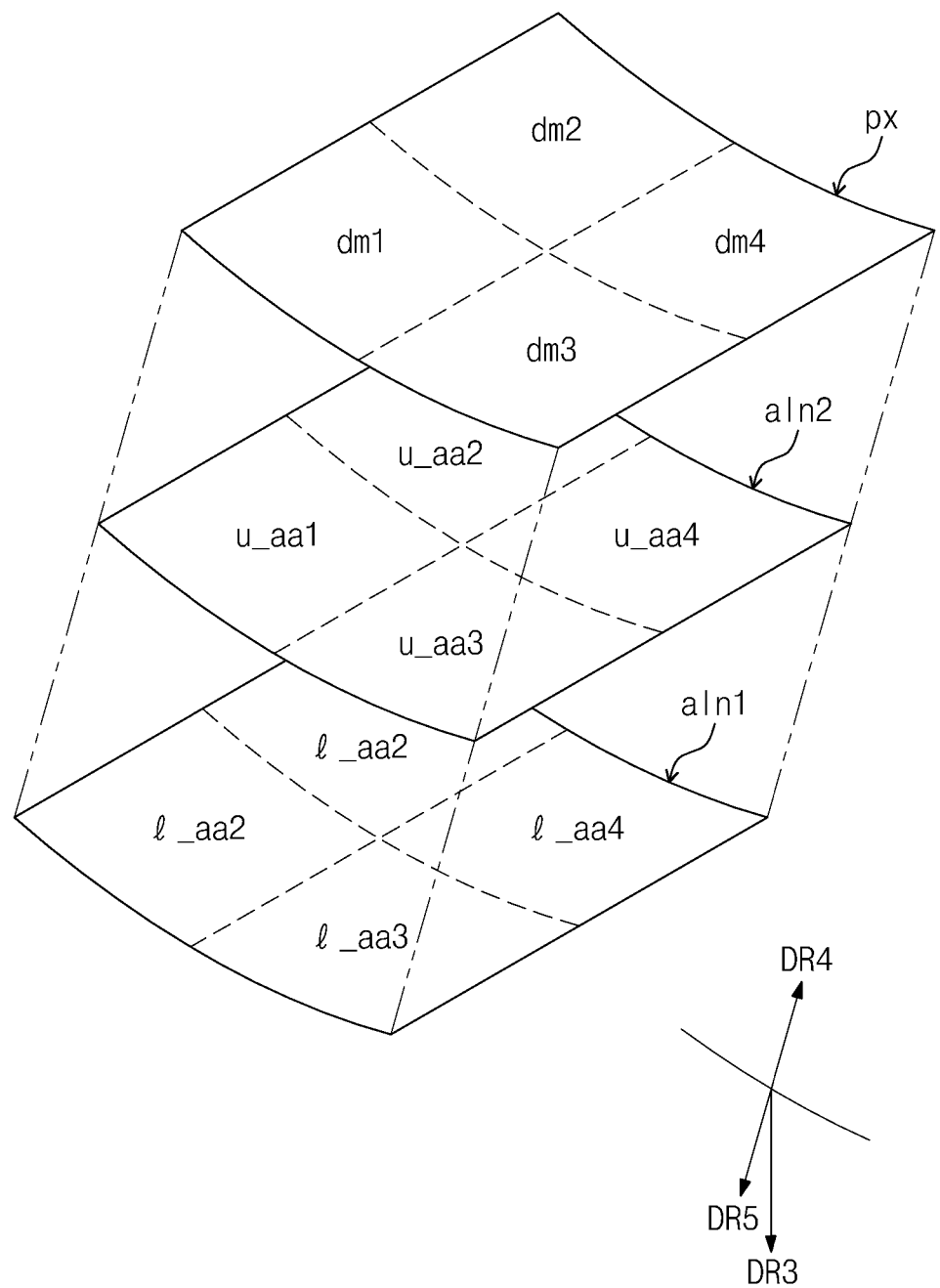
FIG. 7B is a schematic perspective view of a pixel provided in the curved display device according to the comparison example and first and second alignment layers corresponding to the pixel.
Figure 7C:
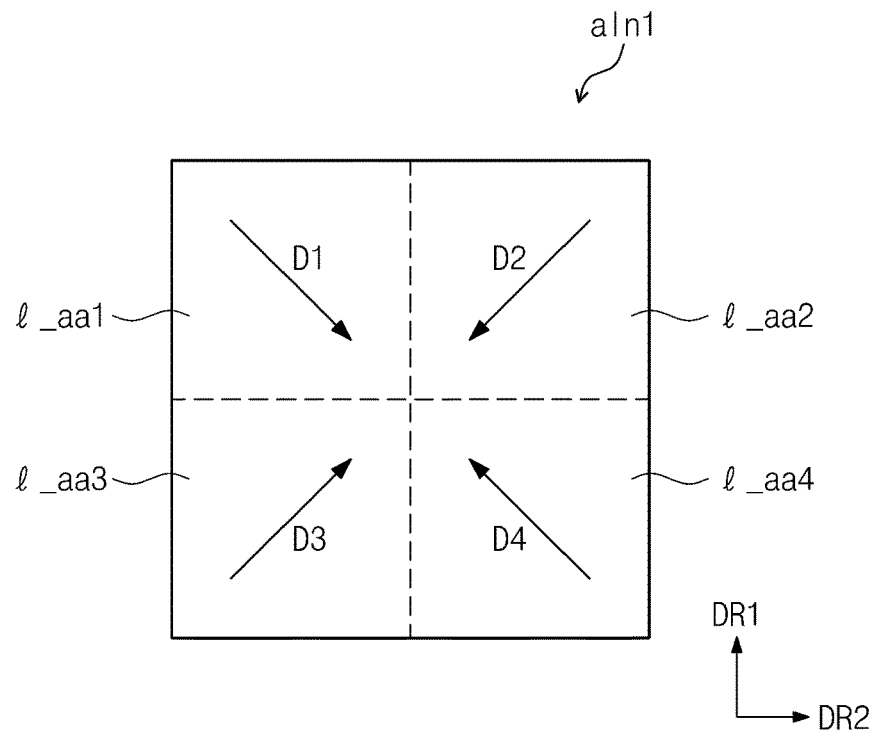
FIG. 7C is a schematic plan view of the first alignment layer when viewed in a direction DR5 of FIG. 7B.
Figure 7D:
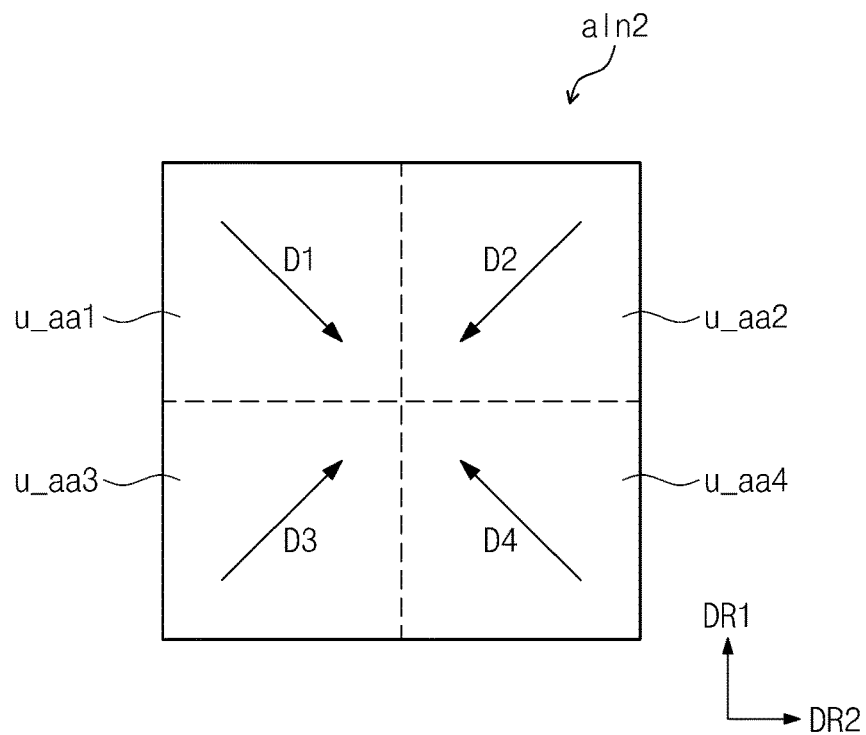
FIG. 7D is a schematic plan view of the second alignment layer when viewed in the direction DR5 of FIG. 7B.
Figure 7E:
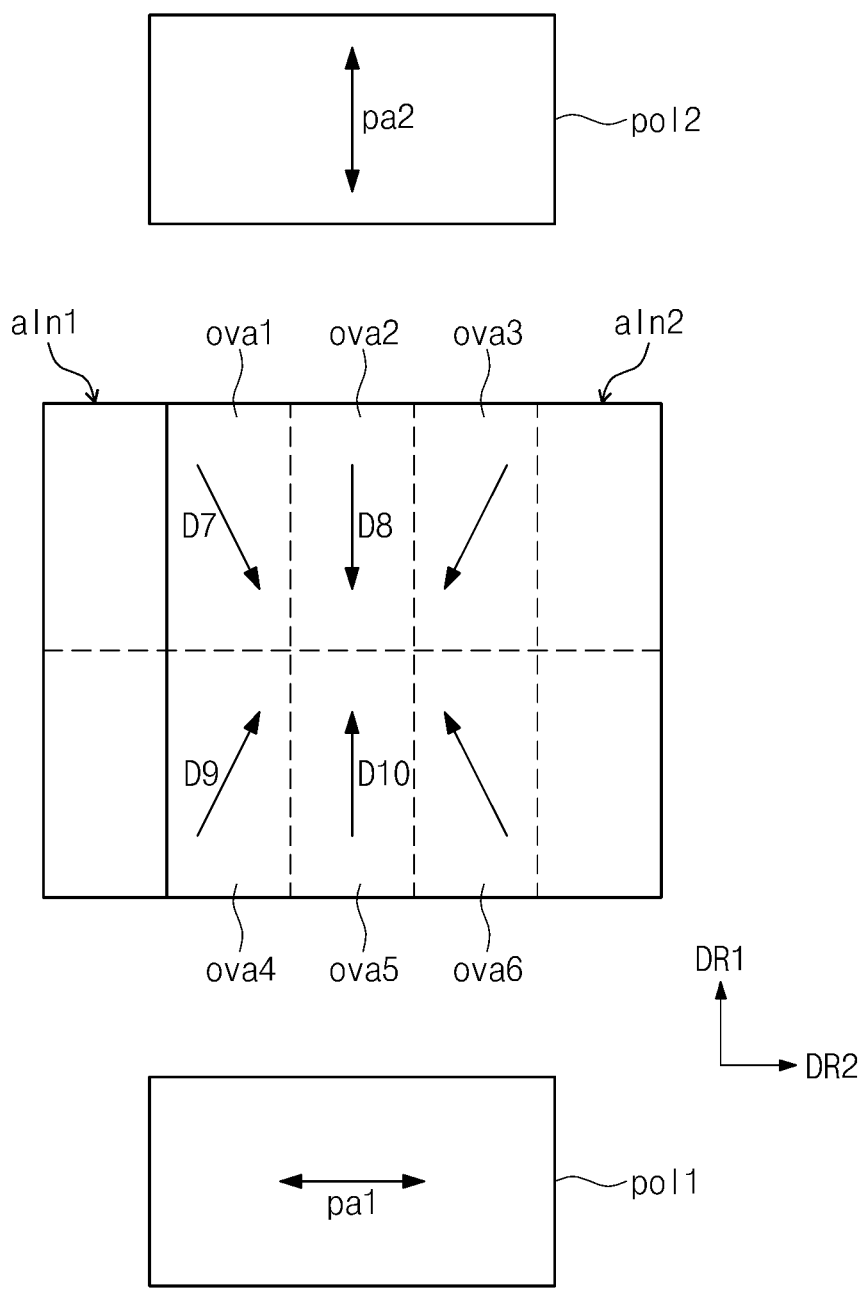
FIG. 7E is a schematic plan view of an overlapping area between the first and second alignment layers in the direction DR3 of FIG. 7B.

FIG. 7A is a schematic perspective view of a curved display device according to a comparison embodiment. FIG. 7B is a schematic perspective view of a pixel provided in the curved display device according to the comparison example and first and second alignment layers corresponding to the pixel. FIG. 7C is a schematic plan view of the first alignment layer when viewed in a direction DR5 of FIG. 7B. FIG. 7D is a schematic plan view of the second alignment layer when viewed in the direction DR5 of FIG. 7B. FIG. 7E is a schematic plan view of an overlapping area between the first and second alignment layers in the direction DR3 of FIG. 7B.

Referring to FIGS. 7A to 7E, a curved display device 1000 according to a comparison example includes a first alignment layer aln1 including reactive mesogens that are polymerized with each other and a second alignment layer aln2 including reactive mesogens that are polymerized with each other. The first and second alignment layers aln1 and aln2 may include the substantially same reactive mesogens that are polymerized with each other. Thus, first liquid crystal molecules on the first alignment layer aln1 may be pretilted, and second liquid crystal molecules on the second alignment layer aln2 may also be pretilted. In an exemplary embodiment, the first liquid crystal molecules and the second liquid crystal molecules may have the same pretilt-angle.

When electric fields are applied to a liquid crystal layer lc1, the first liquid crystal molecules on lower alignment areas l_aa1, l_aa2, l_aa3, and l_aa4 provided on the first alignment layer aln1 and the second liquid crystal molecules on upper alignment areas u_aa1, u_aa2, u_aa3, and u_aa4 provided on the second alignment layer aln2 are parallely aligned in the same direction. Since all of the first and second liquid crystal molecules are pretilted, rates at which the first and second liquid crystal molecules are parallely aligned may be similar to each other.

More particularly, when a driving voltage is applied to apply the electric fields, the first liquid crystal molecules on the first lower alignment area l_aa1 and the second liquid crystal molecules on the first upper alignment area u_aa1 are parallely aligned in a first sub direction D1, and the first liquid crystal molecules on the second lower alignment area l_aa2 and the second liquid crystal molecules on the second upper alignment area u_aa2 are parallely aligned in a second sub direction D2. The first liquid crystal molecules on the third lower alignment area l_aa3 and the second liquid crystal molecules on the third upper alignment area u_aa3 are parallely aligned in a third sub direction D3, and the first liquid crystal molecules on the fourth lower alignment area l_aa4 and the second liquid crystal molecules on the fourth upper alignment area u_aa4 are parallely aligned in a fourth sub direction D4.

Referring to FIG. 7E, when viewed in a third direction DR3 (See FIG. 7B), the first and second alignment layers aln1 and aln2 have overlapping areas ova1, ova2, ova3, ova4, ova5, and ova6. The overlapping areas ova1, ova2, ova3, ova4, ova5, and ova6 include a first overlapping area ova1, a second overlapping area ova2, a third overlapping area ova3, a fourth overlapping area ova4, a fifth overlapping area ova5, and a sixth overlapping area ova6.

In case of the curved display device 1000 according to the comparison example, all of the first and second liquid crystal molecules are pretilted on the second overlapping area ova2. Thus, an optical axis direction of the liquid crystal layer LCL on the second overlapping area ova1 is substantially parallel to an eight sub direction D8 that is the sum of the first and second sub directions D1 and D2. Similarly, an optical axis direction of the liquid crystal layer LCL on the fifth overlapping area ova5 is substantially parallel to a tenth sub direction D10 that is the sum of the third and fourth sub directions D3 and D4.

The curved display device 1000 according to the comparison example may also include a lower polarization plate pol1 and an upper polarization plate pol2. In an exemplary embodiment, a first transmission axis pa1 of the lower polarization plate pol1 and a second transmission axis pa2 of an upper polarization plate pol2 are perpendicular to each other. In an exemplary embodiment, when the first transmission axis pa1 of the lower polarization plate pol1 is parallel to the second direction DR2, the second transmission axis pa2 of the upper polarization plate pol2 is parallel to the first direction DR1. In an exemplary embodiment, the first direction DR1 may be parallel to the eight sub direction or the tenth sub direction D10.

Thus when the driving voltage is applied to apply the electric fields in the curved display device 1000 according to the comparison example, the optical axis direction of the liquid crystal layer lc1 within the second and fifth overlapping areas ova2 and ova5 may be parallel to a direction of the first transmission layer pa1 of the lower polarization plate pol1 or the second transmission layer pa2 of the upper polarization plate pol2.

When the direction of the first transmission axis pa1 of the lower polarization plate pol1 is parallel to the optical axis direction of the liquid crystal layer lc1 within each of the second and fifth overlapping areas ova2 and ova5, light passing through the lower polarization plate pol1 may be blocked by the second transmission axis pa2 of the upper polarization plate pol2 after passing through the second and fifth overlapping area ova2 and ova5.

In an exemplary embodiment, when the direction of the second transmission axis pa2 of the upper polarization plate pol2 is parallel to the optical axis direction of the liquid crystal layer lc1 within each of the second and sixth overlapping areas ova2 and ova6, light passing through the lower polarization plate pol1 may be blocked without passing through the second and fifth overlapping area ova2 and ova5. Thus, the user may see light of the second and fifth overlapping areas ova2 and ova5.

That is, in the curved display device according to the comparison example, the first liquid crystal molecules on the lower alignment area of the first alignment layer and the second liquid crystal molecules on the upper alignment area of the second alignment layer are aligned in the same direction. Thus, when the first and second substrates are curved, the user does not see light to cause texture defects by which the light is darkly seen within the pixel.

Although the first liquid crystal molecules of the curved display device according to an exemplary embodiment of invention, which is described with reference to FIGS. 6A to 6F is pretilted at the first pretilt-angle, the second liquid crystal molecules are not substantially pretilted to have a second pretilt-angle different from the first pretilt-angle. Thus, even though the curved display device according to an exemplary embodiment of the invention is curved, the texture defect may not occur. Therefore, the curved display device according to an exemplary embodiment of the invention concept may have improved display quality.

Hereinafter, a method of manufacturing the curved display device according to an exemplary embodiment of the invention will be described. Hereinafter, different points with respect to the curved display device according to the foregoing exemplary embodiment of the invention will be mainly described, and thus, non-explained portions will be quoted from the curved display device according to the foregoing exemplary embodiment of the invention.

Figure 8:
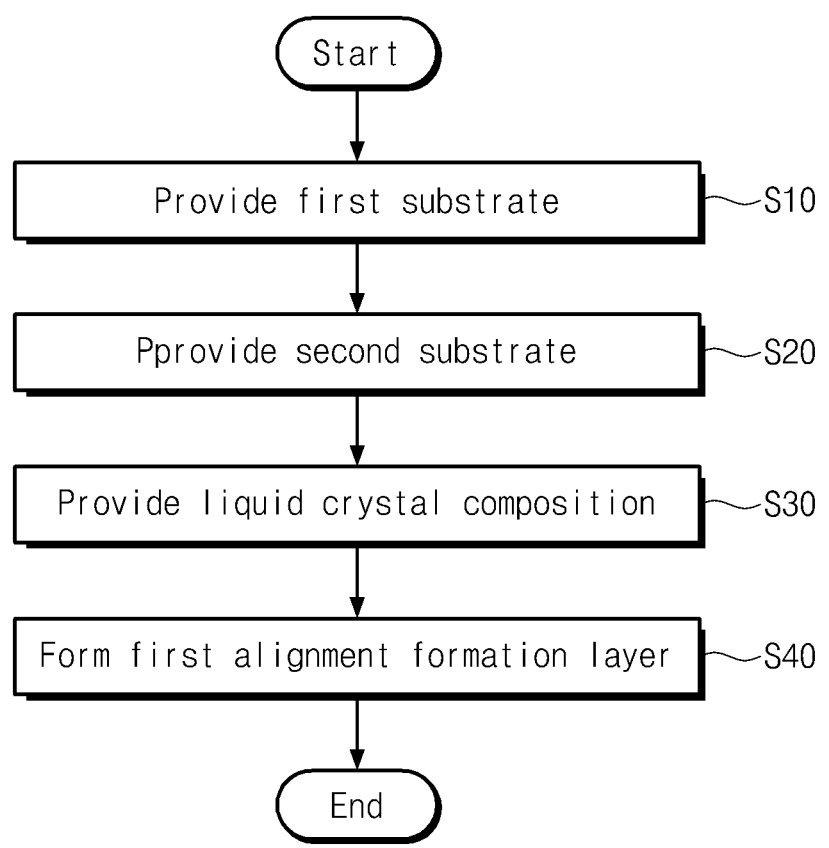
FIG. 8 is a schematic flowchart illustrating an exemplary embodiment of a method of manufacturing the curved display device according to the invention.

FIG. 8 is a schematic flowchart illustrating a method of manufacturing the curved display device according to an exemplary embodiment of the invention.

Referring to FIGS. 1A to 8, a method of manufacturing the curved display device 10 according to an exemplary embodiment of the invention includes a process S10 of providing a first substrate SUB1, a process S20 of providing a second substrate SUB2, a process S30 of providing a liquid crystal composition including liquid crystal molecules LC and reactive mesogens RM (See FIG. 9) having a predetermined polarity, and a process S40 of providing light and electric fields to the liquid crystal composition to form a first alignment formation layer PTL1 on the first substrate SUB1.

The process S10 of providing the first substrate includes a process of providing a first base substrate BS1 including a pixel and a first base layer PAL1. The first substrate SUB1 may be provided by performing a photolithograph process and insulation layer formation process several times, and the first base layer PAL1 may be provided through coating/deposition/printing processes.

Figure 9:
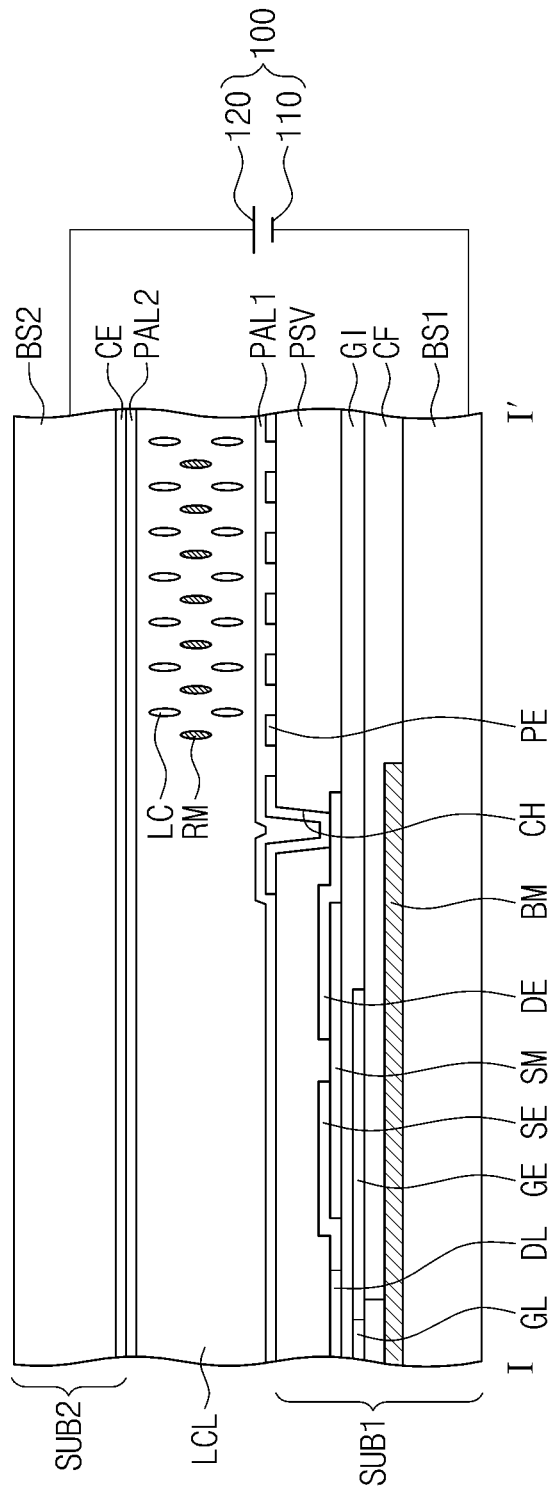
FIGS. 9, 10, and 11 are cross-sectional views illustrating an exemplary embodiment of the method of manufacturing the curved display device according to the invention.
Figure 10:
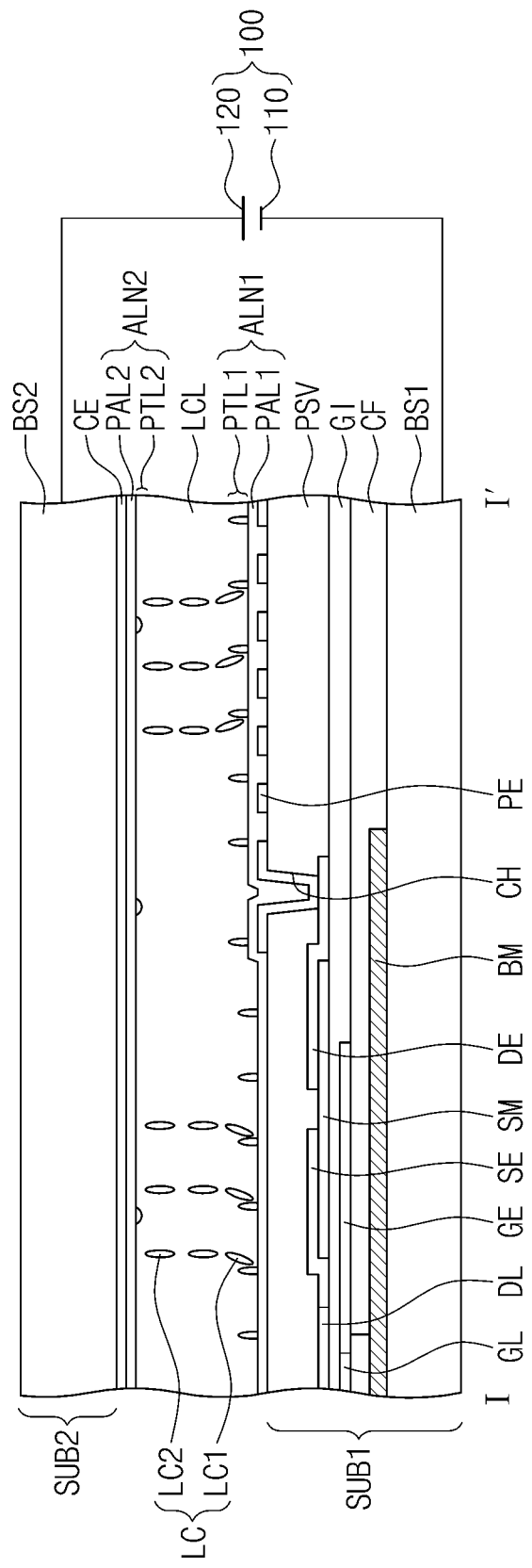
Figure 11:
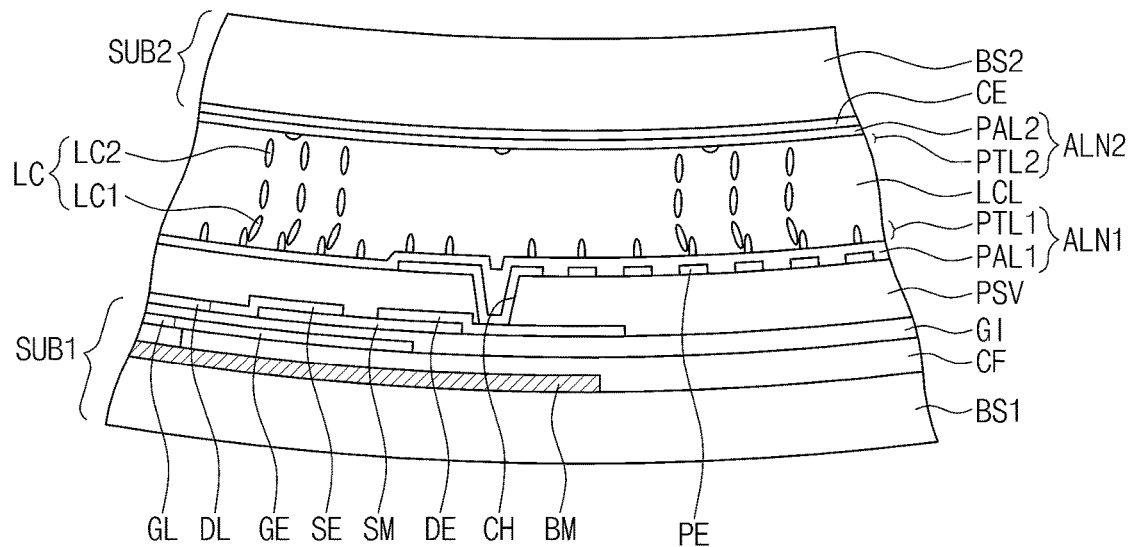
Figure 12:
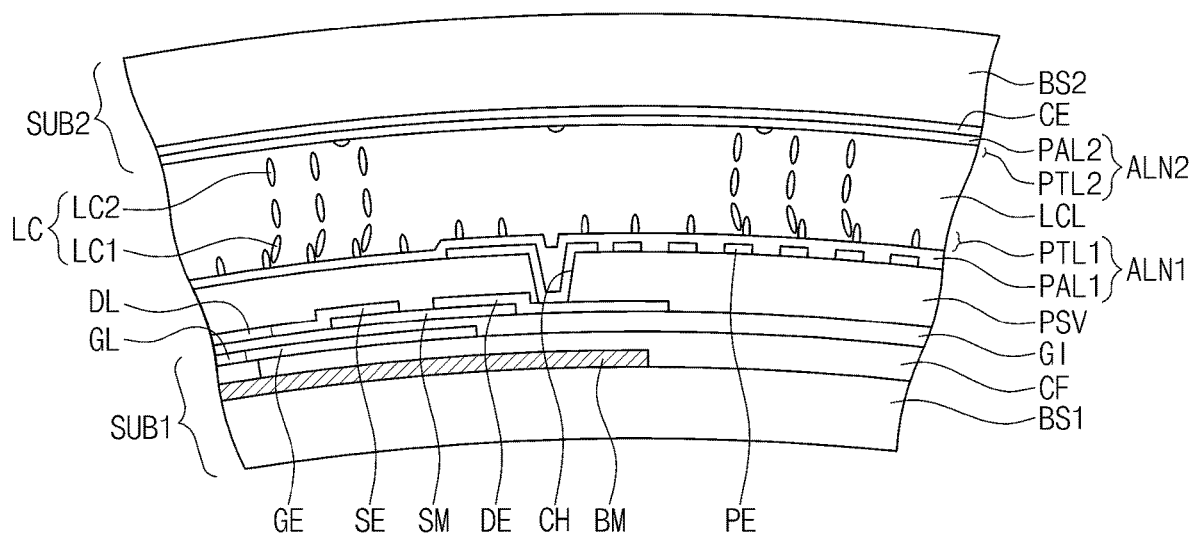
FIG. 12 is a cross-sectional view illustrating an exemplary embodiment of one process in the method of manufacturing the curved display device according to the invention in accordance with FIG. 11.

FIGS. 9, 10, and 11 are cross-sectional views illustrating the method of manufacturing the curved display device according to an exemplary embodiment of the invention. FIG. 12 is a cross-sectional view illustrating a method of manufacturing the curved display device according to an exemplary embodiment of the invention in accordance with FIG. 11.

Referring to FIGS. 1A to 12, a color filer CF for displaying a color and a black matrix BM are disposed on the first base substrate BS1. Although the color filter CF and the black matrix BM are disposed on the first base substrate BS1 in the method of manufacturing the curved display device according to an exemplary embodiment of the invention, the invention is not limited thereto. In an exemplary embodiment, the color filter CF and the black matrix BM may be disposed on a second base substrate BS2.

The color filter CF may provide a color layer for displaying a red, green, blue, or other colors on the first base substrate BS1. In an exemplary embodiment, the color filter CF may be provided by patterning the color layer through the photolithograph process, for example. However, the formation method of the color filter CF is not limited thereto. In another exemplary embodiment, the color filter CF may be provided by using an inkjet method, for example.

The black matrix BM may be disposed on the first base substrate BS1. In an exemplary embodiment, the black matrix BM may be provided before, after, or just when the color filter CF is provided. A light blocking layer for absorbing light may be disposed on the first base substrate BS1 and then be patterned by using the photolithograph process to form the black matrix BM. In an alternative exemplary embodiment, the black matrix BM may be provided by using other methods, for example, the inkjet method.

A gate pattern is disposed on the color filter CF and the black matrix BM. The gate pattern includes gate lines GL and a storage electrode part. In an exemplary embodiment, the gate pattern may be provided by using the photolithography process, for example.

A gate insulation layer GI is disposed on the gate pattern. A semiconductor pattern SM is disposed on the gate insulation layer GI. The semiconductor pattern SM may include an active pattern and an ohmic contact layer disposed on the active pattern. In an exemplary embodiment, the semiconductor pattern SM may be provided by using the photolithography process, for example.

A data pattern is disposed on the semiconductor pattern SM. The data pattern includes a data line DL, a source electrode SE, and a drain electrode DE. In an exemplary embodiment, the data pattern may be provided by using the photolithography process, for example. In an exemplary embodiment, the semiconductor layer SM and the data pattern may be provided using one sheet of half mask or diffraction mask, for example.

A protection layer PSV is disposed on the data pattern. A contact hole CH through which a portion of the drain electrode DE is exposed is defined in the protection layer PSV. In an exemplary embodiment, the protection layer PSV may be provided by using the photolithography process, for example.

The pixel electrode PE connected to the drain electrode DE through the contact hole CH is defined on the protection layer 130. In an exemplary embodiment, the pixel electrode PE may be provided by using the photolithography process, for example.

The first base layer PAL1 is disposed on the first base substrate BS1 on which the pixel electrode PE is disposed. In an exemplary embodiment, a first alignment solution may include polymers such as polyimide, poly(amic acid), polyamide, poly(amic imide), polyester, polyethylene, polyurethane, or polystyrene, combination of the polymers, or a monomer of the polymers. In an exemplary embodiment, the first base layer PAL1 may be provided by heating the first alignment solution or applying ultraviolet ("UV") rays onto the first alignment solution after the first alignment solution is applied to the first base substrate BS1. In an exemplary embodiment, the first alignment solution may include a photoinitiator, for example.

The process S20 of providing the second substrate SUB2 may include a process of providing a common electrode CE on a second base substrate BS2 including the second base layer PAL2.

The common electrode CE is disposed on the second base substrate BS2. The common electrode CE may be provided by using various methods. In an exemplary embodiment, the common electrode CE may be provided by using the photolithography process, for example.

The second base layer PAL2 is disposed on the second base substrate BS2 on which the common electrode CE is disposed. Although not shown, the second base layer PAL2 may be provided by heating a second alignment solution after the second alignment solution is applied to the second substrate SUB2. In an exemplary embodiment, a second alignment solution may include polymers such as polyimide, poly(amic acid), polyamide, poly(amic imide), polyester, polyethylene, polyurethane, or polystyrene, combination of the polymers, or a monomer of the polymers. In an exemplary embodiment, the second base layer PAL2 may be provided by heating the second alignment solution or applying UV rays onto the second alignment solution after the second alignment solution is applied to the second base substrate BS2. In an exemplary embodiment, the second alignment solution may not include the photoinitiator.

In operation S30, the liquid crystal composition is provided between the first and second substrates SUB1 and SUB2. The liquid crystal composition includes liquid crystal molecules LC and reactive mesogens RM having a polarity. Herein, the liquid crystal molecules are expressed as a reference symbol LC regardless of a kind thereof. Since the liquid crystal molecules and the reactive mesogens RM are described above, their detailed descriptions will be omitted.

In operation S40, electric fields are applied to the liquid crystal composition, and the reactive mesogens RM of the liquid crystal composition are cured to form a first alignment formation layer PTL1. The electric fields may be provided by using a power source unit 100 including a first electrode part 110 connected to the first substrate SUB1 and a second electrode part 120 connected to the second substrate SUB2. The connection position between the first substrate and the first electrode part 110 is not specifically limited. When a voltage is capable of being applied to the first substrate SUB1, the first electrode part 110 may be disposed on any position of the first substrate SUB1. The connection position between the second substrate and the second electrode part 120 is not specifically limited. When a voltage is capable of being applied to the second substrate SUB2, the second electrode part 120 may also be disposed on any position of the second substrate SUB2. In an exemplary embodiment, the first electrode part 110 may be connected to the pixel electrode PE, and the second electrode part 120 may be connected to the common electrode CE.

When the electric fields are applied to the liquid crystal composition, the reactive mesogens RM having the predetermined polarity may move in a predetermined direction. A case in which the reactive mesogens RM having positive polarity will be described as an example. When a first voltage is applied to the first electrode part 110, and a second voltage greater than the first voltage is applied to the second electrode part 120, the reactive mesogens RM having the positive polarity may move to the first alignment formation layer PTL1. A negative voltage may be applied to the first electrode part 110, and the second electrode part 120 may be grounded. The first electrode 110 may be grounded, and the positive voltage may be applied to the second electrode part 120.

A case in which the reactive mesogens RM having negative polarity will be described as an example. When a first voltage is applied to the first electrode part 110, and a second voltage less than the first voltage is applied to the second electrode part 120, the reactive mesogens RM having the negative polarity may move to the first alignment formation layer PTL1. A positive voltage may be applied to the first electrode part 110, and the second electrode part 120 may be grounded. The first electrode 110 may be grounded, and the negative voltage may be applied to the second electrode part 120.

Although the electric fields are applied by using the first and second electrode parts to move the reactive mesogens RM having a functional group toward the first substrate SUB1 in the method of manufacturing the curved display device 10 according to an exemplary embodiment of the invention, the first base layer PTL1 may include the photoinitiator, and the second base layer PTL2 may not include the photoinitiator to move the reactive mesogens RM toward the first substrate SUB1.

Light such as UV rays may be provided to the liquid crystal composition to cure the reactive mesogens RM included in the liquid crystal composition. When the light is provided, the reactive mesogens RM may be polymerized and thus be coupled to the first base layer PAL1. Thus, the first alignment formation layer PTL1 is disposed on the first base layer PAL1. The reactive mesogens RM that are polymerized with each other may form a plurality of patterns each of which has an island shape. That is, the first alignment formation layer PTL1 may be provided by randomly spacing the polymerized reactive mesogens RM or spacing the polymerized reactive mesogens RM at a predetermined distance. The polymerized reactive mesogens RM may be provided, for example, in a side chain shape. The first alignment formation layer PTL1 may pretilt the first liquid crystal molecules LC1.

Although the reactive mesogens RM is included in the liquid crystal composition in the method of manufacturing the curved display device 10 according to an exemplary embodiment of the invention, the invention is not limited thereto. In an exemplary embodiment, the reactive mesogens RM may be included in the first alignment solution.

The first liquid crystal molecules LC1 adjacent to the first alignment formation layer PTL1 have a pretilt-angle AN1. Even though a voltage is further applied to the first liquid crystal molecules LC1 that are pretilted to have the first pretilt-angle AN1, the first alignment formation layer PTL1 may have the pretilt-angle AN1. In an exemplary embodiment, the first pretilt-angle AN1 may be a mean value or representative value of pretilt-angles of the first liquid crystal molecules LC1.

When the electric fields are applied to the liquid crystal composition, the reactive mesogens RM may not nearly move toward the second base layer PTL2. However, a small amount of reactive mesogens RM may move. Thus, the second alignment formation layer PTL2 may be disposed on the second base layer PAL2. The second alignment formation layer PTL2 includes reactive mesogens RM that are synthesized with each other. In an exemplary embodiment, the polymerized reactive mesogens RM may be provided, for example, in a side chain shape or network shape. However, when compared to an amount of first alignment formation layer PTL1, an amount of second alignment formation layer PTL2 may be very small. Thus, it may be difficult to pretilt the second liquid crystal molecules LC2. Thus, the second liquid crystal molecules LC2 may have a second pretilt-angle AN2. In an exemplary embodiment, the second pretilt-angle AN2 may be different from the first pretilt-angle AN1. In an exemplary embodiment, the second pretilt-angle AN2 may be a mean value or representative value of pretilt-angles of the second liquid crystal molecules LC2.

Referring to FIGS. 11 and 12, the method for manufacturing the curved display device 10 according to an exemplary embodiment of the invention may further include a process of bending the first and second substrates SUB1 and SUB2. The first substrate SUB1 may have a first curvature radius R1 (See FIG. 2). The second substrate SUB2 may have a second curvature radius R2 (See FIG. 2).

Referring to FIGS. 2 and 11, the first curvature radius R1 may be greater than the second curvature radius R2. In FIG. 11, an image may be displayed from the first substrate SUB1 toward the second substrate SUB2. Referring to FIGS. 2 and 12, the first curvature radius R1 may be less than the second curvature radius R2. FIG. 12 illustrates a state in which the display device of FIG. 11 is reversely bent. In FIG. 12, an image may be displayed from the second substrate SUB2 toward the first substrate SUB1.

In the curved display device manufactured by the method of manufacturing the curved display device according to the comparison example, the first liquid crystal molecules on the lower alignment areas of the first alignment layer and the second liquid crystal molecules on the upper alignment areas of the second alignment layer corresponding to the lower alignment areas are aligned in the same direction. Thus, as described above, in the curved display device according to the comparison example, when the display device is curved, light may not seen to cause the texture defect by which the light is darkly seen within the pixel.

Although the first liquid crystal molecules of the curved display device according to an exemplary embodiment of invention is pretilted at the first pretilt-angle, the second liquid crystal molecules are not substantially pretilted to have the second pretilt-angle different from the first pretilt-angle. Thus, even though the curved display device manufactured by the method of manufacturing the curved display device according to an exemplary embodiment of the invention is curved, the texture defect may not occur. Therefore, the curved display device manufactured by the method of manufacturing the curved display device according to an exemplary embodiment of the invention may have the improved display quality.

In the curved display device according to the exemplary embodiment of the invention, the plurality of domains defined in the pixel may be provided in various directions to reduce the texture defects.

In the method of manufacturing the curved display device according to the exemplary embodiment of the invention, the curved display device having the improved display quality may be provided.

Although the exemplary embodiment of the invention is described with reference to the accompanying drawings, those with ordinary skill in the technical field of the invention pertains will be understood that the invention can be carried out in other specific forms without changing the technical idea or essential features. Thus, the above-disclosed exemplary embodiments are to be considered illustrative and not restrictive.

What is claimed is:

1. A display device comprising:
   a first substrate;
   a second substrate facing the first substrate;
   a liquid crystal layer disposed between the first and second substrates, the liquid crystal layer comprising liquid crystal molecules;
   a first alignment layer disposed between the first substrate and the liquid crystal layer, the first alignment layer includes reactive mesogens which are polymerized with each other and a photoinitiator; and
   a second alignment layer disposed between the liquid crystal layer and the second substrate,
   wherein a material of the first alignment layer is different from a material of the second alignment layer, and
   wherein an entire composition of the second alignment layer does not include the photoinitiator.

2. The display device of claim 1, wherein the liquid crystal molecules comprises:
   first liquid crystal molecules which are adjacent to the first alignment layer and have a first pretilt-angle, and
   second liquid crystal molecules, which are adjacent to the second alignment layer and have a second pretilt-angle which is different from the first pretilt-angle, and
   wherein the first pretilt-angle is an angle defined by a first line provided in one surface of the first alignment layer and a long axis of the first liquid crystal molecules, and the second pretilt-angle is an angle defined by a second line provided in one surface of the second alignment layer and a long axis of the second liquid crystal molecules, and wherein the first and second pretilt-angles are equal to or less than 90°.

3. The display device of claim 2, wherein the first pretilt-angle is less than the second pretilt-angle.

4. The display device of claim 2, wherein the first pretilt-angle is 80° to 90°.

5. The display device of claim 2, wherein the second pretilt-angle is 88° to 90°.

6. The display device of claim 1, wherein the reactive mesogens have a functional group having charges.

7. The display device of claim 1, wherein the first alignment layer comprises a first base layer disposed on the first substrate and a first alignment formation layer disposed on the first base layer, and wherein the first base layer includes the photoinitiator and the first alignment formation layer includes the reactive mesogens.

8. A curved display device comprising:
a first bent substrate;
a second bent substrate facing the first bent substrate;
a liquid crystal layer disposed between the first and second bent substrates, the liquid crystal layer comprising liquid crystal molecules;
a first alignment layer disposed between the first bent substrate and the liquid crystal layer, the first alignment layer includes a photoinitiator and reactive mesogens which are polymerized with each other; and
a second alignment layer disposed between the liquid crystal layer and the second bent substrate,
wherein an entire composition of the second alignment layer does not include the photoinitiator.

9. The curved display device of claim 8, wherein the liquid crystal molecules comprises:

first liquid crystal molecules which are adjacent to the first alignment layer and have a first pretilt-angle, and second liquid crystal molecules, which are adjacent to the second alignment layer and have a second pretilt-angle which is different from the first pretilt-angle, and wherein the first pretilt-angle is an angle defined by a first line provided in one surface of the first alignment layer and a long axis of the first liquid crystal molecules, and the second pretilt-angle is an angle defined by a second line provided in one surface of the second alignment layer and a long axis of the second liquid crystal molecules.

10. The curved display device of claim 9, wherein the first pretilt-angle is less than the second pretilt-angle.

11. The curved display device of claim 8, wherein the first alignment layer comprises a first base layer disposed on the first bent substrate and a first alignment formation layer disposed on the first base layer, and wherein the first base layer includes the photoinitiator and the first alignment formation layer includes the reactive mesogens.

12. The curved display device of claim 8, wherein the reactive mesogens have a functional group having charges.

13. The curved display device of claim 8, wherein the first bent substrate has a first curvature radius, and the second bent substrate has a second curvature radius different from the first curvature radius.

14. The curved display device of claim 13, wherein the first curvature radius is greater than or equal to the second curvature radius.

* * * * *